United States Patent
Wang et al.

(10) Patent No.: US 12,501,052 B2
(45) Date of Patent: Dec. 16, 2025

(54) ENHANCED SIGNALING OF SUPPLEMENTAL ENHANCEMENT INFORMATION

(71) Applicants: Beijing Bytedance Network Technology Co., Ltd., Beijing (CN); Bytedance Inc., Los Angeles, CA (US)

(72) Inventors: Ye-Kui Wang, San Diego, CA (US); Yang Wang, Beijing (CN); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 14 days.

(21) Appl. No.: 18/397,033

(22) Filed: Dec. 27, 2023

(65) Prior Publication Data

US 2024/0137526 A1    Apr. 25, 2024

Related U.S. Application Data

(63) Continuation of application No. PCT/CN2022/101411, filed on Jun. 27, 2022.

(30) Foreign Application Priority Data

Jun. 28, 2021 (WO) ................ PCT/CN2021/102636

(51) Int. Cl.
*H04N 19/157* (2014.01)
*H04N 19/103* (2014.01)
(Continued)

(52) U.S. Cl.
CPC ......... *H04N 19/157* (2014.11); *H04N 19/103* (2014.11); *H04N 19/124* (2014.11);
(Continued)

(58) Field of Classification Search
CPC .. H04N 19/157; H04N 19/103; H04N 19/124; H04N 19/132; H04N 19/136;
(Continued)

(56) References Cited

U.S. PATENT DOCUMENTS

2014/0192149 A1    7/2014  Wang
2015/0304665 A1   10/2015  Hannuksela
(Continued)

FOREIGN PATENT DOCUMENTS

CN    104641639 A    5/2015
CN    110519602 A   11/2019
(Continued)

OTHER PUBLICATIONS

"Series H: Audiovisual and multimedia systems Infrastructure of audiovisual services - Coding of moving video High efficiency video coding," ITU-T and ISO/IEC, Rec. Itu-T H.265 Iso/Iec 23008-2 (in force edition), Sep. 2023, 718 pages.
(Continued)

*Primary Examiner* — Jae N Noh
(74) *Attorney, Agent, or Firm* — Conley Rose, P.C.

(57) ABSTRACT

A mechanism for processing video data is disclosed. A value of an annotated region (AR) object label index of an i-th AR object index (ar_object_label_idx[ar_object_idx[i]]) syntax element is determined. The ar_object_label_idx[ar_object_idx[i]] syntax element is specified to be in a range of N to M, where N and M are integers and N is less than M. A conversion is performed between a visual media data and a bitstream based on the ar_object_label_idx[ar_object_idx [i]] syntax element.

19 Claims, 7 Drawing Sheets

(51) Int. Cl.
H04N 19/124 (2014.01)
H04N 19/132 (2014.01)
H04N 19/136 (2014.01)
H04N 19/172 (2014.01)
H04N 19/184 (2014.01)
H04N 19/186 (2014.01)
H04N 19/30 (2014.01)
H04N 19/70 (2014.01)

(52) U.S. Cl.
CPC ......... *H04N 19/132* (2014.11); *H04N 19/136* (2014.11); *H04N 19/172* (2014.11); *H04N 19/184* (2014.11); *H04N 19/186* (2014.11); *H04N 19/30* (2014.11); *H04N 19/70* (2014.11)

(58) Field of Classification Search
CPC .. H04N 19/172; H04N 19/184; H04N 19/186; H04N 19/30; H04N 19/70
See application file for complete search history.

(56) References Cited

U.S. PATENT DOCUMENTS

| | | | |
|---|---|---|---|
| 2016/0219306 | A1 | 7/2016 | Pettersson |
| 2019/0141340 | A1* | 5/2019 | Reddiar ............... H04N 19/136 |
| 2021/0360289 | A1 | 11/2021 | He et al. |
| 2022/0103867 | A1 | 3/2022 | Wang |
| 2023/0007304 | A1* | 1/2023 | Choi ...................... H04N 19/70 |
| 2024/0040135 | A1* | 2/2024 | Wang ..................... H04N 19/70 |

FOREIGN PATENT DOCUMENTS

| | | | |
|---|---|---|---|
| JP | 7640755 | B2 | 3/2025 |
| JP | 7640756 | B2 | 3/2025 |
| JP | 7697065 | B2 | 6/2025 |
| WO | 2015115946 | A1 | 8/2015 |
| WO | 2020206171 | A1 | 10/2020 |
| WO | 2021067501 | A1 | 4/2021 |

OTHER PUBLICATIONS

Document: JVET-G1001-v1, Chen, J., et al., "Algorithm Description of Joint Exploration Test Model 7 (JEM7)," Joint Video Exploration Team (JVET) of Itu-T Sg 16 WP 3 and Iso/Iec Jtc 1/SC 29/WG 11 7th Meeting: Torino, IT, Jul. 13- 21, 2017, 50 pages.
"Series H: Audiovisual and Multimedia Systems Infrastructure of audiovisual services - Coding of moving video Versatile video coding," Rec. Itu-T H.266 Iso/Iec 23090-3, Aug. 2020, 516 pages.
Document: JVET-S2001-vH, Bross, B., et al., "Versatile Video Coding (Draft 10)," Joint Video Experts Team (JVET) of Itu-T Sg 16 WP 3 and Iso/Iec Jtc 1/SC 29/WG 11 19th Meeting: by teleconference, 22 June - Jul. 1, 2020, 548 pages.
"Series H: Audiovisual and Multimedia Systems Infrastructure of audiovisual services—Coding of moving video Versatile supplemental enhancement information messages for coded video bitstreams," Rec. ITU-T Rec. H.274 | ISO/IEC 23002-7, Aug. 2020, 86 pages.
Document: JVET-S2007-v7, Boyce, J., et al., "Versatile supplemental enhancement information messages for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 85 pages.
Document: JVET-V2006-v1, Boyce, J., et al., "Additional SEI messages for VSEI (Draft 3)," Joint Video Experts Team (JVET) of ITU-T SG 16 WP 3 and ISO/IEC JTC 1/SC 29 22nd Meeting, by teleconference, Apr. 20-28, 2021, 28 pages.
Document: JVET-U2006-v1, Boyce, J., et al., "Additional SEI messages for VSEI (Draft 2)," Joint Video Experts Team (JVET) of ITU-T SG 16 WP 3 and ISO/EC JTC 1/SC 29 21st Meeting, by teleconference, Jan. 6-15, 2021, 20 pages.
Document: JVET-V0065-v1, Wang, Y., et al., "AHG9: On the DRAP and EDRAP indication SEI messages," Joint Video Experts Team (VET) of ITU-T SG 16 WP 3 and ISO/IEC JTC 1/SC 29, 22nd Meeting, by teleconference, Apr. 20-28, 2021, 4 pages.
International Search Report from PCT Application No. PCT/CN2022/101411 dated Aug. 30, 2022, 10 pages.
International Search Report from PCT Application No. PCT/CN2022/101456 dated Sep. 27, 2022, 10 pages.
International Search Report from PCT Application No. PCT/CN2022/101412 dated Jul. 28, 2022, 10 pages.
Document: JCT3V-B0164, Shimizu, S., et al., "3D-HEVC HLS on depth definition," Joint Collaborative Team on 3D Video Coding Extension Development of ITU-T SG 16 WP 3 and ISO/IEC JTC 1/SC 29/WG 11 2nd Meeting: Shanghai, CN, Oct. 13-19, 2012, 4 pages.
Grimaldi L et al: "Preliminary Results of MFC plus Depth", 107. MPEG Meeting; Jan. 13, 2014-Jan. 17, 2014; San Jose; (Motion Picture Expert Group or ISO/IEC JTC1/SC2 9/WG11), (Jan. 14, 2014), XP030271297, JCT3V-G01155-r2.zip Annex I_MF6pulsD.docx.
Document: JVET-Y2006-v2, Boyce, J., et al., "Additional SEI messages for VSEI (Draft 6)," Joint Video Experts Team (JVET) of ITU-T SG 16 WP 3 and 1S0/IEC JTC 1/SC 29 25th Meeting, by teleconference, Jan. 12-21, 2022, 32 pages.
Extended European Search Report from European Application No. 22831925.7 dated Apr. 18, 2024, 10 pages.
Extended European Search Report from European Application No. 22831943.0 dated Apr. 18, 2024, 10 pages.
Extended European Search Report from European Application No. 22831926.5 dated Apr. 11, 2024, 9 pages.
Non-Final Office Action for U.S. Appl. No. 18/396,893, mailed May 12, 2025, 26 pages.

* cited by examiner

ENHANCED SIGNALING OF SUPPLEMENTAL ENHANCEMENT INFORMATION

CROSS-REFERENCE TO RELATED APPLICATIONS

This application is a continuation of International Patent Application No. PCT/CN2022/101411, filed on Jun. 27, 2022, which claims the benefit of International Application No. PCT/CN2021/102636, filed on Jun. 28, 2021. All the aforementioned patent applications are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining a value of an annotated region (AR) object label index of an i-th AR object index (ar_object_label_idx[ar_object_idx[i]]) syntax element that is specified to be in a range of N to M, where N and M are integers and N is less than M; and performing a conversion between a visual media data and a bitstream based on the ar_object_label_idx[ar_object_idx[i]] syntax element.

Optionally, in any of the preceding aspects, another implementation of the aspect provides that N is 0 and M is 3, 7, 15, 31, 63, or 255.

Optionally, in any of the preceding aspects, another implementation of the aspect provides that the range of N to M is inclusive.

Optionally, in any of the preceding aspects, another implementation of the aspect provides determining a value of a depth representation type (depth_representation_type) syntax element that is specified to be in a range of A to B, where A and B are integers and A is less than B.

Optionally, in any of the preceding aspects, another implementation of the aspect provides that A is 0 and B is 3, 7, 15, 31, 63, 127, or 255.

Optionally, in any of the preceding aspects, another implementation of the aspect provides that the range of A to B is inclusive.

Optionally, in any of the preceding aspects, another implementation of the aspect provides determining a value of an i-th depth nonlinear representation model (depth_nonlinear_representation_model[i]) syntax element that is specified to be in a range of C to D, where C and D are integers and C is less than D.

Optionally, in any of the preceding aspects, another implementation of the aspect provides that C is 0 and D is 6, 14, 30, 62, 126, or 254.

Optionally, in any of the preceding aspects, another implementation of the aspect provides that the range of C to D is inclusive.

Optionally, in any of the preceding aspects, another implementation of the aspect provides determining a value of a disparity reference view identifier (disparity_ref_view_id) syntax element that is specified to be in a range of E to F, where E and F are integers and E is less than F.

Optionally, in any of the preceding aspects, another implementation of the aspect provides that E is 0 and F is 63, 127, 255, 511, 1023, 2047, 4095, 8191, 16383, 32767, or 65535.

Optionally, in any of the preceding aspects, another implementation of the aspect provides that the range of E to F is inclusive.

Optionally, in any of the preceding aspects, another implementation of the aspect provides that the ar_object_label_idx[ar_object_idx[i]] syntax element is included in an annotated region (AR) supplemental enhancement information (SEI) message.

Optionally, in any of the preceding aspects, another implementation of the aspect provides that the depth_representation_type syntax element is included in a Depth Representation Information (DRI) SEI message.

Optionally, in any of the preceding aspects, another implementation of the aspect provides that the depth_nonlinear_representation_model[i] syntax element is included in the DRI SEI message.

Optionally, in any of the preceding aspects, another implementation of the aspect provides that the disparity_ref_view_id syntax element is included in the DRI SEI message.

Optionally, in any of the preceding aspects, another implementation of the aspect provides that the conversion includes encoding the visual media data into the bitstream.

Optionally, in any of the preceding aspects, another implementation of the aspect provides that the conversion includes decoding the bitstream to obtain the visual media data.

A second aspect relates to apparatus for processing video data comprising: a processor; and a non-transitory memory with instructions thereon, wherein the instructions upon execution by the processor, cause the processor to perform the method of any of the preceding aspects.

A third aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A fourth aspect relates to a non-transitory computer-readable recording medium storing a bitstream of a video which is generated by a method performed by a video processing apparatus, wherein the method comprises: determining a value of an annotated region (AR) object label index of an i-th AR object index (ar_object_label_idx[ar_object_idx[i]]) syntax element that is specified to be in a range of N to M, where N and M are integers and N is less than M; and generating a bitstream based on the determining A fifth aspect relates to a method for storing bitstream of a video comprising: determining a value of an annotated region (AR) object label index of an i-th AR object index (ar_object_label_idx[ar_object_idx[i]]) syntax element that is specified to be in a range of N to M, where N and M are integers and N is less than M; generating a bitstream based on the determining; and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
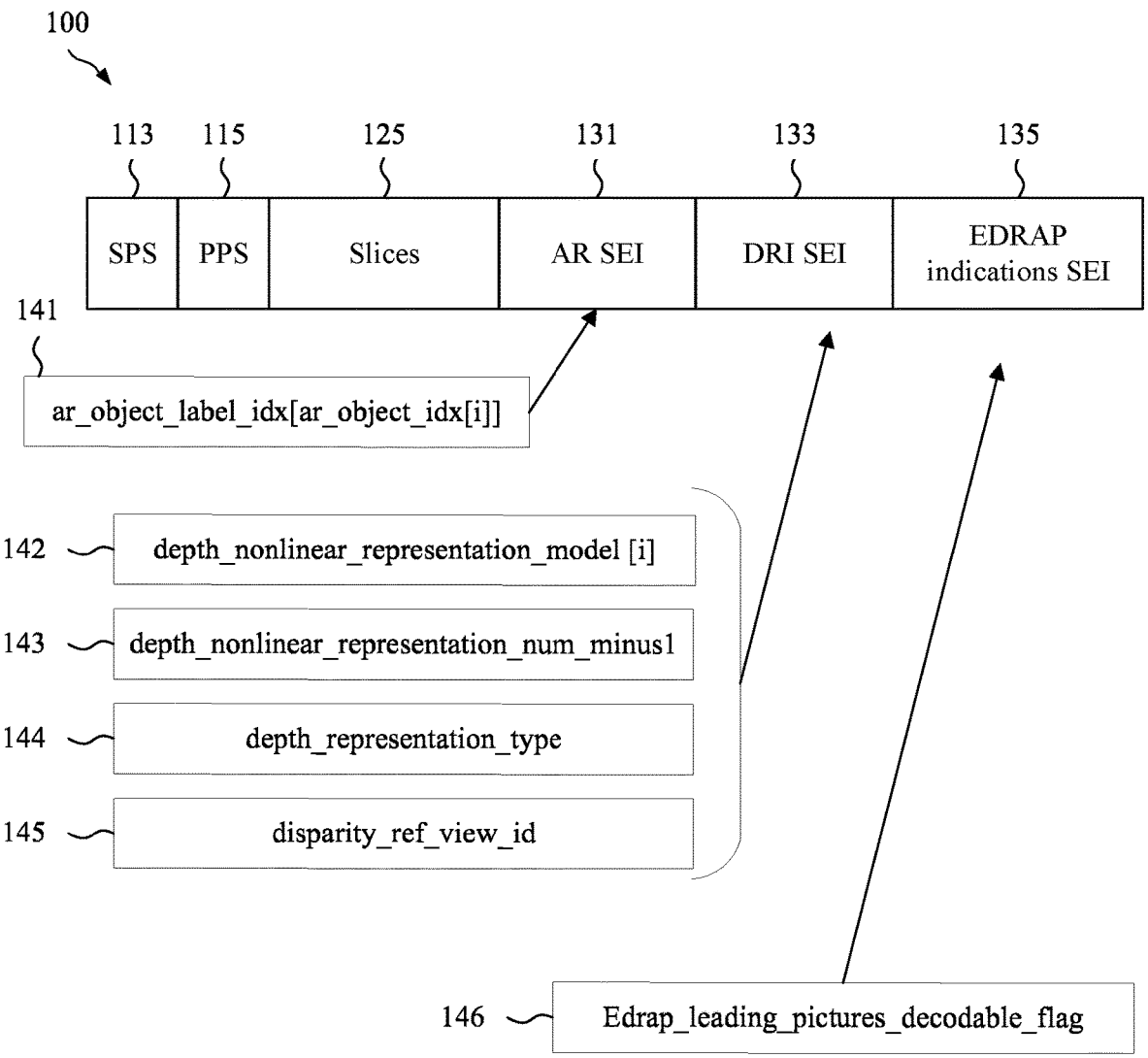
FIG. 1 is a schematic diagram illustrating an example bitstream.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure is related to image and/or video coding technologies. Specifically, this disclosure is related to signaling of annotated regions, depth representation information, and extended dependent random-access point (EDRAP) indications in supplemental enhancement information (SEI) messages. The examples may be applied individually or in various combinations, for video bitstreams coded by any codec, such as the versatile video coding (VVC) standard and the versatile SEI messages for coded video bitstreams (VSEI) standard.

The present disclosure includes the following abbreviations. Alpha Channel Information (ACI), Adaptation Parameter Set (APS), Access Unit (AU), Coded Layer Video Sequence (CLVS), Coded Layer Video Sequence Start (CLVSS), Cyclic Redundancy Check (CRC), Color Transform Information (CTI), Coded Video Sequence (CVS), Dependent Random Access Point (DRAP), Depth Representation Information (DRI), Extended Dependent Random Access Point (EDRAP), Finite Impulse Response (FIR), Intra Random Access Point (TRAP), Multiview Acquisition Information (MAI), Network Abstraction Layer (NAL), Picture Parameter Set (PPS), Picture Unit (PU), Random Access Skipped Leading (RASL), Region-Wise Packing (RWP), Sample Aspect Ratio (SAR), Sample Aspect Ratio (SAR), Sample Aspect Ratio Information (SARI), Scalability Dimension Information (SDI), Supplemental Enhancement Information (SEI), Step-wise Temporal Sublayer Access (STSA), Video Coding Layer (VCL), Versatile Supplemental Enhancement Information, also known as Rec. ITU-T H.274 I ISO/IEC 23002-7, (VSEI), Video Usability Information (VUI), and Versatile Video Coding, also known as Rec. ITU-T H.266|ISO/IEC 23090-3, (VVC).

Video coding standards have evolved primarily through the development of the International Telecommunication Union (ITU) Telecommunications Standardization Sector (ITU-T) and ISO/International Electrotechnical Commission (IEC) standards. The ITU-T produced H.261 and H.263, ISO/IEC produced Motion Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the further video coding technologies beyond HEVC, the Joint Video Exploration Team (JVET) was founded by Video Coding Experts Group (VCEG) and MPEG jointly. Many methods have been adopted by JVET and put into the reference software named Joint Exploration Model (JEM). The JVET was later renamed to be the Joint Video Experts Team (JVET) when the Versatile Video Coding (VVC) project officially started. VVC is a coding standard targeting a 50% bitrate reduction as compared to HEVC. VVC has been finalized by the JVET.

The VVC standard, also known as ITU-T H.266|ISO/IEC 23090-3, and the associated Versatile Supplemental Enhancement Information (VSEI) standard, also known as ITU-T H.274 |ISO/IEC 23002-7, are designed for use in a broad range of applications, such as television broadcast, video conferencing, playback from storage media, adaptive bit rate streaming, video region extraction, composition and merging of content from multiple coded video bitstreams, multiview video, scalable layered coding, and viewport-adaptive three hundred sixty degree (360°) immersive media. The Essential Video Coding (EVC) standard (ISO/IEC 23094-1) is another video coding standard developed by MPEG.

An example amendment to the VSEI standard includes the specification of additional SEI messages including an annotated regions SEI message, an alpha channel information SEI message, a depth representation information SEI message, a multiview acquisition information SEI message, a scalability dimension information SEI message, an extended dependent random-access point (DRAP) indication SEI message, a display orientation SEI message, and a colour transform information SEI message.

An example annotated regions SEI message syntax is as follows.

| | Descriptor |
|---|---|
| annotated_regions( payloadSize ) { | |
|   ar_cancel_flag | u(1) |
|   if( !ar_cancel_flag ) { | |
|     ar_not_optimized_for_viewing_flag | u(1) |
|     ar_true_motion_flag | u(1) |
|     ar_occluded_object_flag | u(1) |
|     ar_partial_object_flag_present_flag | u(1) |

-continued

| | Descriptor |
|---|---|
| ar_object_label_present_flag | u(1) |
| ar_object_confidence_info_present_flag | u(1) |
| if( ar_object_confidence_info_present_flag ) | |
|     ar_object_confidence_length_minus1 | u(4) |
| if( ar_object_label_present_flag ) { | |
|     ar_object_label_language_present_flag | u(1) |
|     if( ar_object_label_language_present_flag ) { | |
|         while( !byte_aligned( ) ) | |
|             ar_bit_equal_to_zero /* equal to 0 */ | f(1) |
|         ar_object_label_language | st(v) |
|     } | |
|     ar_num_label_updates | ue(v) |
|     for( i = 0; i < ar_num_label_updates; i++ ) { | |
|         ar_label_idx[ i ] | ue(v) |
|         ar_label_cancel_flag | u(1) |
|         LabelAssigned[ ar_label_idx[ i ] ] = !ar_label_cancel_flag | |
|         if( !ar_label_cancel_flag ) { | |
|             while( !byte_aligned( ) ) | |
|                 ar_bit_equal_to_zero /* equal to 0 */ | f(1) |
|             ar_label[ ar_label_idx[ i ] ] | st(v) |
|         } | |
|     } | |
| } | |
| ar_num_object_updates | ue(v) |
| for( i= 0; i <= ar_num_object_updates; i++ ) { | |
|     ar_object_idx[ i ] | ue(v) |
|     ar_object_cancel_flag | u(1) |
|     ObjectTracked[ ar_object_idx[ i ] ] = !ar_object_cancel_flag | |
|     if( !ar_object_cancel_flag ) { | |
|         if( ar_object_label_present_flag ) { | |
|             ar_object_label_update_flag | u(1) |
|             if( ar_object_label_update_flag ) | |
|                 ar_object_label_idx[ ar_object_idx[ i ] ] | ue(v) |
|         } | |
|         ar_bounding_box_update_flag | u(1) |
|         if( ar_bounding_box_update_flag ) { | |
|             ar_bounding_box_cancel_flag | u(1) |
|             ObjectBoundingBoxAvail[ ar_object_idx[ i ] ] = !ar_bounding_box_cancel_flag | |
|             if( !ar_bounding_box_cancel_flag ) { | |
|                 ar_bounding_box_top[ ar_object_idx[ i ] ] | u(16) |
|                 ar_bounding_box_left[ ar_object_idx[ i ] ] | u(16) |
|                 ar_bounding_box_width[ ar_object_idx[ i ] ] | u(16) |
|                 ar_bounding_box_height[ ar_object_idx[ i ] ] | u(16) |
|                 if( ar_partial_object_flag_present_flag ) | |
|                     ar_partial_object_flag[ ar_object_idx[ i ] ] | u(1) |
|                 if( ar_object_confidence_info_present_flag ) | |
|                     ar_object_confidence[ ar_object_idx[ i ] ] | u(v) |
|             } | |
|         } | |
|     } | |
| } | |

An example annotated regions SEI message semantics is as follows. The annotated regions SEI message carries parameters that identify annotated regions using bounding boxes representing the size and location of identified objects. Use of this SEI message may require the definition of the following variables. Such variables include a cropped picture width and picture height in units of luma samples, denoted herein by CroppedWidth and CroppedHeight, respectively; a chroma sub-sampling width and height, denoted as SubWidthC and SubHeightC, respectively; a conformance cropping window left offset denoted as ConfWinLeftOffset; and a conformance cropping window top offset, denoted as ConfWinTopOffset.

An ar_cancel_flag set equal to 1 indicates that the annotated regions SEI message cancels the persistence of any previous annotated regions SEI message that is associated with one or more layers to which the annotated regions SEI message applies. An ar_cancel_flag set equal to 0 indicates that annotated regions information follows. When ar_cancel_flag is equal to 1 or a new CVS of the current layer begins, the variables LabelAssigned[i], ObjectTracked[i], and ObjectBoundingBoxAvail are set equal to 0 for i in the range of 0 to 255, inclusive.

An ar_not_optimized_for_viewing_flag set equal to 1 indicates that the decoded pictures that the annotated regions SEI message applies to are not optimized for user viewing, but rather are optimized for some other purpose such as algorithmic object classification performance. An ar_not_optimized_for_viewing_flag set equal to 0 indicates that the decoded pictures that the annotated regions SEI message applies to may or may not be optimized for user viewing.

An ar_true_motion_flag set equal to 1 indicates that the motion information in the coded pictures that the annotated regions SEI message applies to was selected with a goal of accurately representing object motion for objects in the annotated regions. An ar_true_motion_flag set equal to 0 indicates that the motion information in the coded pictures that the annotated regions SEI message applies to may or may not be selected with a goal of accurately representing object motion for objects in the annotated regions.

An ar_occluded_object_flag set equal to 1 indicates that the ar_bounding_box_top[ar_object_idx[i]], ar_bounding_box_left[ar_object_idx[i]], ar_bounding_box_width[ar_object_idx[i]], and ar_bounding_box_height[ar_object_idx[i]] syntax elements each represent the size and location of an object or a portion of an object that may not be visible or may be only partially visible within the cropped decoded picture. An ar_occluded_object_flag set equal to 0 indicates that the ar_bounding_box_top[ar_object_idx[i]], ar_bounding_box_left[ar_object_idx[i]], ar_bounding_box_width[ar_object_idx[i]], and ar_bounding_box_height[ar_object_idx[i]] syntax elements represent the size and location of an object that is entirely visible within the cropped decoded picture. Bitstream conformance may require that the value of ar_occluded_object_flag shall be the same for all annotated_regions( ) syntax structures within a CVS.

An ar_partial_object_flag_present_flag set equal to 1 indicates that ar_partial_object_flag[ar_object_idx[i]] syntax elements are present. An ar_partial_object_flag_present_flag set equal to 0 indicates that ar_partial_object_flag[ar_object_idx[i]] syntax elements are not present. Bitstream conformance may require that the value of ar_partial_object_flag_present_flag shall be the same for all annotated_regions( ) syntax structures within a CVS.

An ar_object_label_present_flag set equal to 1 indicates that label information corresponding to objects in the annotated regions is present. An ar_object_label_present_flag set equal to 0 indicates that label information corresponding to the objects in the annotated regions is not present.

An ar_object_confidence_info_present_flag set equal to 1 indicates that ar_object_confidence[ar_object_idx[i]] syntax elements are present. An ar_object_confidence_info_present_flag set equal to 0 indicates that ar_object_confidence[ar_object_idx[i]] syntax elements are not present. Bitstream conformance may require that the value of ar_object_confidence_present_flag shall be the same for all annotated_regions( ) syntax structures within a CVS.

An ar_object_confidence_length_minus1+1 specifies the length, in bits, of the ar_object_confidence[ar_object_idx[i]] syntax elements. Bitstream conformance may require that the value of ar_object_confidence_length_minus1 shall be the same for all annotated_regions( ) syntax structures within a CVS.

An ar_object_label_language_present_flag set equal to 1 indicates that the ar_object_label_language syntax element is present. An ar_object_label_language_present_flag set equal to 0 indicates that the ar_object_label_language syntax element is not present. An ar_bit_equal_to_zero shall be equal to zero.

An ar_object_label_language contains a language tag followed by a null termination byte equal to 0x00. The length of the ar_object_label_language syntax element shall be less than or equal to 255 bytes, not including the null termination byte. When not present, the language of the label is unspecified.

An ar_num_label_updates indicates the total number of labels associated with the annotated regions that will be signaled. The value of ar_num_label_updates shall be in the range of 0 to 255, inclusive. An ar_label_idx[i] indicates the index of the signaled label. The value of ar_label_idx[i] shall be in the range of 0 to 255, inclusive.

An ar_label_cancel_flag set equal to 1 cancels the persistence scope of the ar_label_idx[i]-th label. An ar_label_cancel_flag set equal to 0 indicates that the ar_label_idx[i]-th label is assigned a signaled value. An ar_label[ar_label_idx[i]] specifies the contents of the ar_label_idx[i]-th label. The length of the ar_label[ar_label_idx[i]] syntax element shall be less than or equal to 255 bytes, not including the null termination byte.

An ar_num_object_updates indicates the number of object updates to be signaled. An ar_num_object_updates shall be in the range of 0 to 255, inclusive. An ar_object_idx[i] is the index of the object parameters signaled. An ar_object_idx[i] shall be in the range of 0 to 255, inclusive. An ar_object_cancel_flag set equal to 1 cancels the persistence scope of the ar_object_idx[i]-th object. An ar_object_cancel_flag set equal to 0 indicates that parameters associated with the ar_object_idx[i]-th object tracked object will be signaled. An ar_object_label_update_flag set equal to 1 indicates that an object label is signaled. An ar_object_label_update_flag equal to 0 indicates that an object label is not signaled.

An ar_object_label_idx[ar_object_idx[i]] indicates the index of the label corresponding to the ar_object_idx[i]-th object. When an ar_object_label_idx[ar_object_idx[i]] is not present, its value is inferred from a previous annotated regions SEI messages in output order in the same CVS, if any. An ar_bounding_box_update_flag set equal to 1 indicates that object bounding box parameters are signaled. An ar_bounding_box_update_flag set equal to 0 indicates that object bounding box parameters are not signaled.

An ar_bounding_box_cancel_flag set equal to 1 cancels the persistence scope of the ar_bounding_box_top[ar_object_idx[i]], ar_bounding_box_left[ar_object_idx[i]], ar_bounding_box_width[ar_object_idx[i]], ar_bounding_box_height[ar_object_idx[i]], ar_partial_object_flag[ar_object_idx[i]], and ar_object_confidence[ar_object_idx[i]]. An ar_bounding_box_cancel_flag set equal to 0 indicates that ar_bounding_box_top [ar_object_idx[i]], ar_bounding_box_ left[ar_object_idx[i]], ar_bounding_box_width [ar_object_idx[i]] ar_bounding_box_height[ar_object_idx [i]] ar_partial_object_flag [ar_object_idx[i]], and ar_object_confidence[ar_object_idx[i]] syntax elements are signaled.

An ar_bounding_box_top[ar_object_idx[i]], ar_bounding_box_left[ar_object_idx [i]], ar_bounding_box_width [ar_object_idx[i]], and ar_bounding_box_height[ar_object_idx [i]] specify the coordinates of the top-left corner and the width and height, respectively, of the bounding box of the ar_object_idx[i]-th object in the cropped decoded picture, relative to the conformance cropping window specified by the active SPS.

The value of ar_bounding_box_left[ar_object_idx[i]] shall be in the range of 0 to CroppedWidth/SubWidthC−1, inclusive. The value of ar_bounding_box_top[ar_object_idx [i]] shall be in the range of 0 to CroppedHeight/SubHeightC−1, inclusive. The value of deleteCroppedWidth/SubWidthC−ar_bounding_box_left[ar_object_idx[i]], inclusive. The value of ar_bounding_box_height[ar_object_idx[i]] shall be in the range of 0 to CroppedHeight/SubHeightC−ar_bounding_box_top[ar_object_idx[i]], inclusive. The identified object rectangle contains the luma samples with horizontal picture coordinates from SubWidthC*(ConfWinLeftOffset+ar_bounding_box_left [ar_object_idx[i]]) to SubWidthC*(ConfWinLeftOffset+ar_bounding_box_left[ar_object_idx[i]]+ar_bounding_box_width[ar_object_idx[i]])−1, inclusive, and vertical picture coordinates from SubHeightC*(ConfWinTopOffset+ar_bounding_box_top[ar_object_idx[i]]) to SubHeightC* (ConfWinTopOffset+ar_bounding_box_top[ar_object_idx [i]]+ar_bounding_box_height [ar_object_idx[i]])−1, inclusive. The values of ar_bounding_box_top[ar_object_idx[i]], ar_bounding_box_left[ar_object_idx[i]], ar_bounding_box_width[ar_object_idx[i]] and ar_bounding_box_height [ar_object_idx[i]] persist in output order within the CVS for each value of ar_object_idx[i]. When not present, the values of ar_bounding_box_top[ar_object_idx[i]], ar_bounding_box_left[ar_object_idx[i]], ar_bounding_box_width[ar_object_idx[i]] or ar_bounding_box_height[ar_object_idx[i]] are inferred from a previous annotated regions SEI message in output order in the CVS, if any.

An ar_partial_object_flag[ar_object_idx[i]] set equal to 1 indicates that the ar_bounding_box_top[ar_object_idx[i]], ar_bounding_box_left[ar_object_idx[i]], ar_bounding_box_width[ar_object_idx[i]] and ar_bounding_box_height [ar_object_idx[i]] syntax elements represent the size and location of an object that is only partially visible within the cropped decoded picture. An ar_partial_object_flag[ar_object_idx[i]] set equal to 0 indicates that the ar_bounding_box_top[ar_object_idx[i]], ar_bounding_box_left[ar_object_idx[i]], ar_bounding_box_width[ar_object_idx[i]] and ar_bounding_box_height[ar_object_idx[i]] syntax elements represent the size and location of an object that may or may not be only partially visible within the cropped decoded picture. When not present, the value of ar_partial_object_flag[ar_object_idx[i]] is inferred from a previous annotated regions SEI message in output order in the CVS, if any.

An ar_object_confidence[ar_object_idx[i]] indicates the degree of confidence associated with the ar_object_idx[i]-th object, in units of 2−(ar_object_confidence_length_minus1+1), such that a higher value of ar_object_confidence [ar_object_idx[i]] indicates a higher degree of confidence. The length of the ar_object_confidence[ar_object_idx[i]] syntax element is ar_object_confidence_length_minus1+1 bits. When not present, the value of object_confidencd [ar_object_idx[i]] is inferred from a previous annotated regions SEI message in output order in the CVS, if any.

A depth representation information SEI message is now discussed. An example depth representation information SEI message syntax is as follows.

|  | Descriptor |
| --- | --- |
| depth_representation_info( payloadSize ) { | |
|   z_near_flag | u(1) |
|   z_far_flag | u(1) |
|   d_min_flag | u(1) |
|   d_max_flag | u(1) |
|   depth_representation_type | ue(v) |
|   if( d_min_flag \|\| d_max_flag ) | |
|     disparity_ref_view_id | ue(v) |
|   if( z_near_flag ) | |
|     depth_rep_info_element( ZNearSign, ZNearExp, ZNearMantissa, ZNearManLen ) | |
|   if( z_far_flag ) | |
|     depth_rep_info_element( ZFarSign, ZFarExp, ZFarMantissa, ZFarManLen ) | |
|   if( d_min_flag ) | |
|     depth_rep_info_element( DMinSign, DMinExp, DMinMantissa, DMinManLen ) | |
|   if( d_max_flag ) | |
|     depth_rep_info_element( DMaxSign, DMaxExp, DMaxMantissa, DMaxManLen ) | |
|   if( depth_representation_type = = 3 ) { | |
|     depth_nonlinear_representation_num_minus1 | ue(v) |
|     for( i = 1; i <= depth_nonlinear_representation_num_minus1 + 1; i++ ) | |
|       depth_nonlinear_representation_model[ i ] | |
|   } | |
| } | |

An example depth representation information element syntax is as follows.

|  | Descriptor |
| --- | --- |
| depth_rep_info_element( OutSign, OutExp, OutMantissa, OutManLen ) { | |
|   da_sign_flag | u(1) |
|   da_exponent | u(7) |
|   da_mantissa_len_minus1 | u(5) |
|   da_mantissa | u(v) |
| } | |

An example depth representation information SEI message semantics is as follows. The syntax elements in the depth representation information (DRI) SEI message specify various parameters for auxiliary pictures of type AUX_DEPTH for the purpose of processing decoded primary and auxiliary pictures prior to rendering on a three-dimensional (3D) display, such as view synthesis. For example, depth or disparity ranges for depth pictures are specified.

Use of this SEI message may requires the definition of the following variable. A bit depth for the samples of the luma component, denoted herein by BitDepthY. When a CVS does not contain an SDI SEI message with sdi_aux_id[i] equal to 2 for at least one value of i, no picture in the CVS shall be associated with a DRI SEI message. When an access unit (AU) contains both an SDI SEI message with sdi_aux_id[i] equal to 2 for at least one value of i and a DRI SEI message, the SDI SEI message shall precede the DRI SEI message in decoding order. When present, the DRI SEI message shall be associated with one or more layers that are indicated as depth auxiliary layers by an SDI SEI message. The following semantics apply separately to each nuh_layer_id targetLayerId among the nuh_layer_id values to which the DRI SEI message applies. When present, the DRI SEI message may be included in any access unit. It is recommended that, when present, the SEI message is included for the purpose of random access in an access unit in which the coded picture with nuh_layer_id equal to targetLayerId is an TRAP picture. The information indicated in the DRI SEI message applies to all the pictures with nuh_layer_id equal to targetLayerId from the access unit containing the SEI message up to but excluding the next picture, in decoding order, associated with a DRI SEI message applicable to targetLayerId or to the end of the CLVS of the nuh_layer_id equal to targetLayerId, whichever is earlier in decoding order.

A z_near_flag set equal to 0 specifies that the syntax elements specifying the nearest depth value are not present in the syntax structure. A z_near_flag set equal to 1 specifies that the syntax elements specifying the nearest depth value are present in the syntax structure. A z_far_flag set equal to 0 specifies that the syntax elements specifying the farthest depth value are not present in the syntax structure. A z_far_flag set equal to 1 specifies that the syntax elements specifying the farthest depth value are present in the syntax structure. A d_min_flag set equal to 0 specifies that the syntax elements specifying the minimum disparity value are not present in the syntax structure. A d_min_flag set equal to 1 specifies that the syntax elements specifying the minimum disparity value are present in the syntax structure. A d_max_flag set equal to 0 specifies that the syntax elements specifying the maximum disparity value are not present in the syntax structure. A d_max_flag set equal to 1 specifies that the syntax elements specifying the maximum disparity value are present in the syntax structure. A depth_representation_type specifies the representation definition of decoded luma samples of auxiliary pictures as specified in Table 1. In Table 1, disparity specifies the horizontal displacement between two texture views and Z value specifies the distance from a camera. The variable maxVal is set equal to (1<<BitDepthY)−1.

TABLE 1

Definition of depth_representation_type

| depth_representation_type | Interpretation |
| --- | --- |
| 0 | Each decoded luma sample value of an auxiliary picture represents an inverse of Z value that is uniformly quantized into the range of 0 to maxVal, inclusive. When z_far_flag is equal to 1, the luma sample value equal to 0 represents the inverse of ZFar (specified below). When z_near_flag is equal to 1, the luma sample value equal to maxVal represents the inverse of ZNear (specified below). |
| 1 | Each decoded luma sample value of an auxiliary picture represents disparity that is uniformly quantized into the range of 0 to maxVal, inclusive. When d_min_flag is equal to 1, the luma sample value equal to 0 represents DMin (specified below). When d_max_flag is equal to 1, the luma sample value equal to maxVal represents DMax (specified below). |
| 2 | Each decoded luma sample value of an auxiliary picture represents a Z value uniformly quantized into the range of 0 to maxVal, inclusive. When z_far_flag is equal to 1, the luma sample value equal to 0 corresponds to ZFar (specified below). When z_near_flag is equal to 1, the luma sample value equal to maxVal represents ZNear (specified below). |
| 3 | Each decoded luma sample value of an auxiliary picture represents a nonlinearly mapped disparity, normalized in range from 0 to maxVal, as specified by depth_nonlinear_representation_num_minus1 and depth_nonlinear_representation_model[ i ]. When d_min_flag is equal to 1, the luma sample value equal to 0 represents DMin (specified below). When d_max_flag is equal to 1, the luma sample value equal to maxVal represents DMax (specified below). |
| Other values | Reserved for future use |

A disparity_ref view_id specifies the ViewId value against which the disparity values are derived. It should be noted that disparity_ref view_id is present only if d_min_flag is equal to 1 or d_max_flag is equal to 1 and is useful for depth_representation_type values equal to 1 and 3. The variables in the x column of Table 2 are derived from the respective variables in the s, e, n and v columns of Table 2 as follows. If the value of e is in the range of 0 to 127, exclusive, x is set equal to $(-1)s*2e-31*(1+n\div2v)$. Otherwise (e is equal to 0), x is set equal to $(-1)s*2-(30+v)*n$.

TABLE 2

Association between depth parameter variables and syntax elements

| x | s | e | n | v |
| --- | --- | --- | --- | --- |
| ZNear | ZNearSign | ZNearExp | ZNearMantissa | ZNearManLen |
| ZFar | ZFarSign | ZFarExp | ZFarMantissa | ZFarManLen |
| DMax | DMaxSign | DMaxExp | DMaxMantissa | DMaxManLen |
| DMin | DMinSign | DMinExp | DMinMantissa | DMinManLen |

The DMin and DMax values, when present, are specified in units of a luma sample width of the coded picture with ViewId equal to ViewId of the auxiliary picture. The units for the ZNear and ZFar values, when present, are identical but unspecified. A depth_nonlinear_representation_num_minus1 plus 2 specifies the number of piece-wise linear segments for mapping of depth values to a scale that is uniformly quantized in terms of disparity. A depth_nonlinear_representation_model[i] for i ranging from 0 to depth_nonlinear_representation_num_minus1+2, inclusive, specify the piece-wise linear segments for mapping of decoded luma sample values of an auxiliary picture to a scale that is uniformly quantized in terms of disparity. The values of depth_nonlinear_representation_model[0] and depth_nonlinear_representation_model[depth_nonlinear_representation_num_minus1+2] are both inferred to be equal to 0.

When depth_representation_type is equal to 3, an auxiliary picture contains nonlinearly transformed depth samples. The variable DepthLUT[i], as specified below, is used to transform decoded depth sample values from the nonlinear representation to the linear representation, e.g., uniformly quantized disparity values. The shape of this transform is defined by a line-segment approximation in two-dimensional linear-disparity-to-nonlinear-disparity space. The first (0, 0) and the last (maxVal, maxVal) nodes of the curve are predefined. Positions of additional nodes are transmitted in form of deviations (depth_nonlinear_representation_model[i]) from the straight-line curve. These deviations are uniformly distributed along the whole range of 0 to maxVal, inclusive, with spacing depending on the value of nonlinear_depth_representation_num_minus1.

The variable DepthLUT[i] for i in the range of 0 to maxVal, inclusive, is specified as follows:

for($k=0$;
  $k<=$depth_nonlinear_representation_num_minus1+
  1; $k$++) { pos1=(maxVal*$k$)/(depth_nonlinear_representation_num_minus1+2)

dev1=depth_nonlinear_representation_model[$k$]

pos2=(maxVal*($k$+1))/(depth_nonlinear_representation_num_minus21+2)

dev2=depth_nonlinear_representation_model[$k$+1]     (X)

$x1$=pos1−dev1

$y1$=pos1+dev1

$x2$=pos2−dev2

$y2$=pos2+dev2 for($x$=Max($x1$, 0); $x$<=Min($x2$, maxVal); $x$++)

DepthLUT[$x$]=Clip3(0, maxVal, Round((($x−x1$)*
  ($y2−y1$))÷($x2÷x1$)+$y1$))}

When depth_representation_type is equal to 3, DepthLUT [dS] for all decoded luma sample values dS of an auxiliary picture in the range of 0 to maxVal, inclusive, represents disparity that is uniformly quantized into the range of 0 to maxVal, inclusive.

Depth representation information element semantics are as follows. The syntax structure specifies the value of an element in the DRI SEI message. The syntax structure sets the values of the OutSign, OutExp, OutMantissa and OutManLen variables that represent a floating-point value. When the syntax structure is included in another syntax structure, the variable names OutSign, OutExp, OutMantissa and OutManLen are to be interpreted as being replaced by the variable names used when the syntax structure is included.

A da_sign_flag set equal to 0 indicates that the sign of the floating-point value is positive. A da_sign_flag set equal to 1 indicates that the sign is negative. The variable OutSign is set equal to da_sign_flag. A da_exponent specifies the exponent of the floating-point value. The value of da_exponent shall be in the range of 0 to 27-2, inclusive. The value 27-1 is reserved. Decoders shall treat the value 27-1 as indicating an unspecified value. The variable OutExp is set equal to da_exponent. A da_mantissa_len_minus1 plus 1 specifies the number of bits in the da_mantissa syntax element. The value of da_mantissa_len_minus1 shall be in the range of 0 to 31, inclusive. The variable OutManLen is set equal to da_mantissa_len_minus1+1. A da_mantissa specifies the mantissa of the floating-point value. The variable OutMantissa is set equal to da_mantissa.

An extended DRAP indication SEI message is as follows. An example extended DRAP indication SEI message syntax is as follows.

| | Descriptor |
|---|---|
| extended_drap_indication( payloadSize ) { | |
|   edrap_rap_id_minsu1 | u(16) |
|   edrap_leading_pictures_decodable_flag | u(1) |
|   edrap_reserved_zero_12bits | u(12) |
|   edrap_num_ref_rap_pics_minus1 | u(3) |
|   for( i= 0; i <= edrap_num_ref_rap_pics_minus1; i++ ) | |
|     edrap_ref_rap_id[ i ] | u(16) |
| } | |

An example extended DRAP indication SEI message semantics is as follows. The picture associated with an extended DRAP (EDRAP) indication SEI message is referred to as an EDRAP picture. The presence of the EDRAP indication SEI message indicates that the constraints on picture order and picture referencing specified in this subclause apply. These constraints can enable a decoder to properly decode the EDRAP picture and the pictures that are in the same layer and follow it in both decoding order and output order without needing to decode any other pictures in the same layer except the list of pictures referenceablePictures. This includes a list of TRAP or EDRAP pictures in decoding order that are within the same CLVS and identified by the edrap_ref_rap_id[i] syntax elements.

The constraints indicated by the presence of the EDRAP indication SEI message, which shall all apply, are as follows. The EDRAP picture is a trailing picture. The EDRAP picture has a temporal sublayer identifier equal to 0. The EDRAP picture does not include any pictures in the same layer in the active entries of its reference picture lists except the referenceablePictures. Any picture that is in the same layer and follows the EDRAP picture in both decoding order and output order does not include, in the active entries of its reference picture lists, any picture that is in the same layer and precedes the EDRAP picture in decoding order or output order, with the exception of the referenceablePictures.

When edrap_leading_pictures_decodable_flag is equal to 1, the following applies. Any picture that is in the same layer and follows the EDRAP picture in decoding order shall follow, in output order, any picture that is in the same layer and precedes the EDRAP picture in decoding order. Any picture that is in the same layer and follows the EDRAP picture in decoding order and precedes the EDRAP picture in output order does not include, in the active entries of its reference picture lists, any picture that is in the same layer and precedes the EDRAP picture in decoding order, with the exception of the referenceablePictures. Any picture in the list referenceablePictures does not include, in the active entries of its reference picture lists, any picture that is in the same layer and is not a picture at an earlier position in the list referenceablePictures. Consequently, the first picture in referenceablePictures, even when it is an EDRAP picture instead of an TRAP picture, does not include any picture from the same layer in the active entries of its reference picture lists.

An edrap_rap_id_minus1 plus 1 specifies the random-access point (RAP) picture identifier, denoted as RapPicId, of the EDRAP picture. Each TRAP or EDRAP picture is associated with a RapPicId value. The RapPicId value for an IRAP picture is inferred to be equal to 0. The RapPicId values for any two EDRAP pictures associated with the same IRAP picture shall be different. An edrap_reserved_zero_12bits shall be equal to 0 in bitstreams conforming to this disclosure. Other values for edrap_reserved_zero_12bits are reserved. Decoders may ignore the value of edrap_reserved_zero_12bits. An edrap_num_ref_rap_pics_minus1 plus 1 indicates the number of IRAP or EDRAP pictures that are within the same CLVS as the EDRAP picture and may be included in the active entries of the reference picture lists of the EDRAP picture. An edrap_ref_rapid[i] indicates a RapPicId of the i-th RAP picture that may be included in the active entries of the reference picture lists of the EDRAP picture. The i-th RAP picture shall be either the IRAP picture associated with the current EDRAP picture or an EDRAP picture associated with the same IRAP picture as the current EDRAP picture.

The following are example technical problems solved by disclosed technical solutions. Example designs for the annotated regions SEI message, the depth representation information SEI message, and the EDRAP indication SEI message have at least the following problems. For the annotated regions SEI message, the value range of the ue(v)-coded syntax element AR object label index of an i-th annotated region object index (ar_object_label_idx[ar_object_idx[i]]) is missing. One practical problem associated with having no value range specified for a ue(v)-coded syntax element is that a design may be unsure how many bits can be used for the corresponding variable in an implementation. If the maximum number of bits used value in the implementation is not sufficient, a decoder may crash when encountering a value that is greater than the maximum value allowed by the number of bits used. For the depth representation information SEI message, the descriptor (e.g., the coding method) of the i-th depth nonlinear representation model (depth_nonlinear_representation_model[i]) syntax element is unspecified. Without specifying the coding method, the decoder may not be able to determine how to parse the syntax element. For the depth representation information SEI message, the value ranges for the ue(v)-coded syntax elements depth representation type (depth_representation_type), disparity reference view identifier (disparity_ref_view_id), depth nonlinear representation number minus one (depth_nonlinear_representation_num_minus1), and depth_nonlinear_representation_model[i] are not specified. For the EDRAP indication SEI message, the semantics of the EDRAP leading pictures decodable flag (edrap_leading_pictures_decodable_flag) syntax element is missing.

Disclosed herein are mechanisms to address one or more of the problems listed above. For example, the present disclosure specifies example value ranges for ar_object_label_idx[ar_object_idx[i]]. Further, the present disclosure specifies example descriptors for depth_nonlinear_representation_model[i]. In addition, the present disclosure specifies example value ranges for depth_representation_type, disparity_ref view_id, depth_nonlinear_representation_num_minus1, and depth_nonlinear_representation_model[i]. In addition, the present disclosure specifies example semantics for edrap_leading_pictures_decodable_flag.

FIG. 1 is a schematic diagram illustrating an example bitstream 100. The bitstream 100 may include compressed video and related syntax. For example, the bitstream 100 may be encoded by an encoder, transmitted across one or more networks, and decoded by a decoder for display to a user. For example, a bitstream 100 may be defined as a sequence of bits that forms a representation of a sequence of access units (AUs) forming one or more coded video sequences (CVSs). An AU is a set of one or more pictures that are associated with a corresponding output time in a video sequence. A bitstream may take the form of a network abstraction layer (NAL) unit stream or a byte stream.

The bitstream 100 includes one or more sequence parameter sets (SPSs) 113, a plurality of picture parameter sets (PPSs) 115, a plurality of slices 125, an annotated region (AR) SEI message 131, a DRI SEI message 133, and an EDRAP indications SEI message 135. An SPS 113 contains sequence data related parameters common to all pictures in a coded video sequence contained in the bitstream 100. The parameters in a SPS 113 can include picture sizing, bit depth, coding tool parameters, bit rate restrictions, etc. It should be noted that, while each sequence refers to a SPS 113, a single SPS 113 can contain data for multiple sequences in some examples. The PPS 115 contains parameters that apply to an entire picture. Hence, each picture in the video sequence may refer to a PPS 115. It should be noted that, while each picture refers to a PPS 115, a single PPS 115 can contain data for multiple pictures in some examples. For example, multiple similar pictures may be coded according to similar parameters. In such a case, a single PPS 115 may contain data for such similar pictures. The PPS 115 can indicate coding tools available for slices in corresponding pictures, quantization parameters, offsets, etc.

The slices each contain a slice header and image data from a region in a picture. The slice header contains parameters that are specific to each slice. Hence, there may be one slice header per slice in the video sequence. The slice header may contain slice type information, picture order counts (POCs), reference picture lists, prediction weights, tile entry points, deblocking parameters, etc. It should be noted that in some examples, a bitstream 100 may also include a picture header, which is a syntax structure that contains parameters that apply to all slices in a single picture. For this reason, a picture header and a slice header may be used interchangeably in some contexts. For example, certain parameters may be moved between the slice header and a picture header depending on whether such parameters are common to all slices in a picture. The image data in the slice 125 contains video data encoded according to inter-prediction and/or intra-prediction as well as corresponding transformed and quantized residual data. The video data from one or more slices can be coded from a picture by an encoder and decoded at a decoder to reconstruct the picture.

A slice 125 may be defined as an integer number of complete tiles or an integer number of consecutive complete coding tree unit (CTU) rows (e.g., within a tile) of a picture, where the tiles or CTU rows are exclusively contained in a single NAL unit. Hence, the slice 125 is also contained in a single NAL unit. The slices 125 are each further divided into CTUs and/or coding tree blocks (CTBs). A CTU is a group of samples of a predefined size that can be partitioned by a coding tree. A CTB is a subset of a CTU and contains luma components or chroma components of the CTU. The CTUs/CTBs are further divided into coding blocks based on coding trees. The coding blocks can then be encoded/decoded according to prediction mechanisms.

The bitstream 100 can include one or more SEI messages. A SEI message is a syntax structure with specified semantics that conveys information that is not needed by the decoding process in order to determine the values of the samples in decoded pictures. The bitstream 100 can include many different SEI messages for different functionality. In the present example, the bitstream includes an AR SEI message 131, a DRI SEI message 133, and an EDRAP indications SEI message 135.

An AR SEI message 131 is an SEI message that carries parameters to identify annotated regions in one or more pictures by employing bounding boxes. The bounding boxes represent a size and a location of an annotated region and identifies one or more objects contained in the annotated region. Accordingly, the AR SEI message 131 contains metadata that describes regions in pictures. The decoder may use the AR SEI message 131 to determine whether to decode and/or how to treat such regions during the display process. The AR SEI message 131 includes an ar_object_label_idx[ar_object_idx[i]] 141 syntax element. The ar_object_label_idx[ar_object_idx[i]] 141 indicates an index of a label corresponding to an i-th indexed AR object (ar_object_idx[i]-th) object. For example, AR objects are indexed and any i-th AR object can be determined by ar_object_idx[i]. Further, AR object labels are indexed and any i-th AR object label can be determined by ar_object_label_idx[i]. As such, the AR SEI ar_object_label_idx[ar_object_idx[i]] 141 obtains the index of the label of the i-th AR object.

A DRI SEI message 133 is an SEI message that carries parameters for pictures that contain depth and/or disparity information for rendering on a three dimensional (3D) display. Depth is a location of a pixel/sample in 3D space. Disparity is a displacement between locations of two features (e.g., two pixels) in an image plane. The DRI SEI message 133 contains a depth_nonlinear_representation_model[i] 142 syntax element, depth_nonlinear_representation_num_minus1 143 syntax element, a depth_representation_type 144 syntax element, and a disparity_ref_view_id 145 syntax element. The depth_nonlinear_representation_model[i] 142 specifies each of i piece-wise linear segments for mapping decoded luma sample values (e.g., depth values) of an auxiliary picture to a scale that is uniformly quantized in terms of disparity. The depth_nonlinear_representation_num_minus1 143 plus two specifies the number of piece-wise linear segments for mapping of depth values to a scale that is uniformly quantized in terms of disparity. Accordingly, the depth_nonlinear_representation_num_minus1 143 plus two specifies the number of i segments in the depth_nonlinear_representation_model[i] 142. The depth_representation_type 144 specifies a representation definition of decoded luma samples of auxiliary pictures. The permissible values for depth_representation_type 144 and a corresponding interpretation of each value is included in table 1 above and/or table Y1 below. The disparity_ref_view_id 145 specifies a view identifier (ViewId) value against which the disparity values are derived. Accordingly, the disparity_ref_view_id 145 indicates a ViewId value used as a reference when determining disparity (e.g., displacement and/or difference between locations) for samples in an auxiliary picture.

An EDRAP indications SEI message 135 indicates usage of EDRAP pictures. An EDRAP picture is a random access picture that is coded by inter prediction based on one or more reference pictures. For example, an EDRAP picture can be coded by reference to a preceding EDRAP picture and/or a preceding TRAP picture. An TRAP picture is coded by intra prediction and can be decoded without reference to other pictures. EDRAP schemes may employ an external bitstream that contains a timed set of reference pictures for each of the EDRAP pictures. In this way, an EDRAP picture can be selected for random access into the main bitstream, and the reference pictures used to decode the EDRAP picture can be obtained from the external bitstream. The EDRAP indications SEI message 135 is an SEI message that indicates the constraints on picture order and picture referencing used to ensure the decoder can select any EDRAP picture for random access and successfully decode the selected EDRAP picture using only the corresponding reference picture (e.g., in the external bitstream). The EDRAP indications SEI message 135 includes an edrap_leading_pictures_decodable_flag 146 syntax element, which contains a value that indicates whether a set of ordering constraints applies to an EDRAP picture corresponding to the EDRAP indications SEI message 135.

The presence of the EDRAP indications SEI message 135 places certain constraints on EDRAP picture order in a bitstream. For example, each EDRAP picture is a trailing picture. Further, each EDRAP picture has a temporal sublayer identifier equal to zero. Temporal sublayers split pictures into a base layer and one or more enhancement layers. A decoder with lesser capabilities can decode and display the base layer for a lower frame rate, while decoders with greater capabilities can decode increasing numbers of enhancement layers to obtain greater frame rates. Limiting the temporal sublayer identifier to zero ensures the EDRAP picture is in the base layer and is therefore usable by all decoders. Another constraint requires that each EDRAP picture does not include any pictures in a same layer in active entries of a reference picture list of the EDRAP pictures except the list of referenceable pictures. The list of referenceable pictures includes TRAP and/or EDRAP pictures in decoding order. Accordingly, this constraint limits EDRAP pictures to only reference preceding IRAP and EDRAP pictures. Yet another constraint requires that any picture that is in a same layer as an EDRAP picture and that follows the EDRAP picture in both decoding order and output order does not include, in active entries of a reference picture list of the picture, any other picture that is in the same layer and precedes the EDRAP picture in decoding order or output order with the exception of the list of referenceable pictures. This constraint prevents pictures that trail the EDRAP picture from referencing pictures that precede the EDRAP picture. In the event of random access at the EDRAP picture, the preceding pictures would not be available, and hence referencing such pictures by a trailing picture would result in an error due to unavailable reference pictures.

The edrap_leading_pictures_decodable_flag 146 syntax element can place additional constraints on the EDRAP picture. A first of such additional constraints specifies that any picture that is in a same layer as the EDRAP picture and that follows the EDRAP picture in decoding order shall follow, in output order, any other picture that is in the same layer as the EDRAP picture and that precedes the EDRAP picture in decoding order. In some instances, coding order and output order are different. This allows for better compression in some cases, but requires that the pictures be reordered before display. Pictures that follow a random access point in decoding order and preceding the random access point in output order are known as leading pictures. This constraint ensures that leading pictures of the EDRAP picture are not placed in front of trailing pictures from a previous EDRAP picture in output order.

A second of such additional constraints specifies that any picture that is in a same layer as the EDRAP picture, that follows the EDRAP picture in decoding order, and that precedes the EDRAP picture in output order shall not include, in active entries of a reference picture list of the picture, any other picture that is in the same layer as the EDRAP picture and that precedes the EDRAP picture in decoding order, with an exception of a list of referenceable pictures. This constraint ensures that leading pictures only reference pictures following the EDRAP picture and IRAP and/or EDRAP pictures in the list of referenceable pictures. This ensures the leading pictures can be decoded when a corresponding EDRAP picture is used for random access.

As noted above, the value ranges, descriptors, and/or semantics of the ar_object_label_idx[ar_object_idx[i]] 141, the depth_nonlinear_representation_model [i] 142, the depth_nonlinear_representation_num_minus1 143, the depth_representation_type 144, the disparity-ref_view_id 145, and the edrap_leading_pictures_decodable_flag 146 are not specified in some example systems. As such, the present disclosure includes such value ranges, descriptors, and/or semantics for the preceding parameters/syntax elements. This allows a decoder to correctly interpret these values without experiencing undefined behavior such as glitches and/or crashes.

It should be noted that the ar_object_label_idx[ar_object_idx[i]] 141, the depth_nonlinear_representation_model [i] 142, the depth_nonlinear_representation_num_minus1 143, the depth_representation_type 144, the disparity ref view_id 145, and the edrap_leading_pictures_decodable_flag 146 can be associated with a descriptor that indicates a coding mechanism used to code the corresponding syntax element. Such descriptors may include ue(v), u(N), se(v), and u(v). ue(v) indicates a syntax element value is coded as an unsigned integer exponential-Golomb coded syntax element with a left bit first and a variable number of bits. Exponential-Golomb code syntax includes representing a value in plus one binary and representing leading zeros as a leading value in minus one format. u(N) indicates a syntax element value is coded as an unsigned integer using N bits. se(v) indicates a syntax element value is coded as a signed integer exponential-Golomb coded syntax element with the left bit first and a variable number of bits. u(v) indicates a syntax element value is coded as an unsigned integer using a variable number of bits.

To solve the above problems, and others, methods as summarized below are disclosed. The items should be considered as examples to explain the general concepts and should not be interpreted in a narrow way. Furthermore, these items can be applied individually or combined in any manner.

Example 1

In one example, to solve at least one of the problems listed above, the value of the ar_object_label_idx[ar_object_idx[i]] 141 syntax element is specified to be in the range of N to M, inclusive, where N and M are integer values and N is less than M. In one example, N=0 and M=255. In an example, the value of ar_object_label_idx[ar_object_idx[i]] 141 is specified to be in a different range, such as 0 to 3 inclusive, 0 to 7 inclusive, 0 to 15 inclusive, 0 to 31 inclusive, 0 to 63 inclusive, etc.

Example 2

In one example, to solve at least one of the problems listed above, the depth_nonlinear_representation_model[i] 142 syntax element is specified to be ue(v)-coded.

Example 3

In one example, the value of depth_nonlinear_representation_model[i] 142 is specified to be in the range of N to M, such as N=0 and M=65535, inclusive. In an example, the value of depth_nonlinear_representation_model[i] 142 is specified to be in a different range, such as 0 to 3 inclusive, 0 to 7 inclusive, 0 to 15 inclusive, 0 to 31 inclusive, 0 to 63 inclusive, 0 to 127 inclusive, 0 to 255 inclusive, 0 to 511 inclusive, 0 to 1023 inclusive, 0 to 2047 inclusive, 0 to 4095 inclusive, 0 to 8191 inclusive, 0 to 16383 inclusive, etc.

Example 4

In one example, the depth_nonlinear_representation_model[i] 142 syntax element is specified to be coded using a different coding method. In one example, the depth_nonlinear_representation_model[i] 142 syntax element is specified to be u(N)-coded, with N equal to a positive integer value, such as a value in the range of 2 to 16, inclusive. In another example, the depth_nonlinear_representation_model[i] 142 syntax element is specified to be se(v)-coded. In another example, the depth_nonlinear_representation_model[i] 142 syntax element is specified to be u(v)-coded, with the length, in units of bits, being specified, for example to be equal to Log2(MaxNumModes) with the variable MaxNumModes indicating the maximum number of modes and the function Log2(x) returning the base-2 logarithm of x.

Example 5

In one example, the depth_nonlinear_representation_num_minus1 143 syntax element is specified to be coded using a different coding method from the ue(v) coding method, such as u(N), u(v), etc.

Example 6

In one example, to solve at least one of the problems listed above, the value of depth_representation_type 144 is specified to be in the range of N to M, inclusive, where N and M are integer values and N is less than M. In one example, N=0 and M=15. In one example, the value of depth_representation_type 144 is specified to be in a different range, such as 0 to 3 inclusive, 0 to 7 inclusive, 0 to 31 inclusive, 0 to 63 inclusive, 0 to 127 inclusive, 0 to 255 inclusive, etc.

Example 7

In one example, to solve at least one of the problems listed above, the value of depth_nonlinear_representation_num_minus1 143 is specified to be in the range of 0 to 62, inclusive. In one example, the value of depth_nonlinear_representation_num_minus 143 is specified to be in a different range, such as 0 to 6 inclusive, 0 to 14 inclusive, 0 to 30 inclusive, 0 to 126 inclusive, 0 to 254 inclusive, etc.

Example 8

In one example, to solve at least one of the problems listed above, the value of disparity_ref_view_id 145 is specified to be in the range of 0 to 1023, inclusive. In one example, the value of disparity_ref_view_id 145 is specified to be in a different range, such as 0 to 63 inclusive, 0 to 127 inclusive, 0 to 255 inclusive, 0 to 511 inclusive, 0 to 2047 inclusive, 0 to 4095 inclusive, 0 to 8191 inclusive, 0 to 16383 inclusive, 0 to 32767 inclusive, 0 to 65535 inclusive, etc.

Example 9

In one example, to solve at least one of the problems listed above, the semantics of the edrap_leading_pictures_decodable_flag 146 syntax element is specified as follows. edrap_leading_pictures_decodable_flag 146 equal to 1 specifies that both of the following constraints apply. Any picture that is in the same layer and follows the EDRAP picture in decoding order shall follow, in output order, any picture that is in the same layer and precedes the EDRAP picture in decoding order. Any picture that is in the same layer and follows the EDRAP picture in decoding order and precedes the EDRAP picture in output order shall not include, in the active entries of its reference picture lists, any picture that is in the same layer and precedes the EDRAP picture in decoding order, with the exception of the referenceablePictures. edrap_leading_pictures_decodable_flag 146 equal to 0 does not impose such constraints.

An embodiment of the preceding examples is now described. This embodiment can be applied to VSEI. Relative to the VSEI specification, most relevant parts that have been added or modified are shown in bold underline font, and some of the deleted parts are shown in bold italics fonts. There may be some other changes that are editorial in nature and thus not highlighted.

An example annotated regions SEI message semantics is as follows. The annotated regions SEI message carries parameters that identify annotated regions using bounding boxes representing the size and location of identified objects.

. . .

ar_object_label_idx[ar_object_idx[i]] indicates the index of the label corresponding to the ar_object_idx[i]-th object. When ar_object_label_idx[ar_object_idx[i]] is not present, its value is inferred from a previous annotated regions SEI messages in output order in the same CVS, if any. The value of ar_object_label_idx[ar_object_idx[i]] shall be in the range of 0 to 255, inclusive.

. . .

Depth Representation Information SEI Message Syntax

|  | Descriptor |
|---|---|
| depth_representation_info( payloadSize ) { |  |
|   z_near_flag | u(1) |
|   z_far_flag | u(1) |
|   d_min_flag | u(1) |
|   d_max_flag | u(1) |
|   depth_representation_type | ue(v) |
|   if( d_min_flag \|\| d_max_flag ) |  |
|     disparity_ref_view_id | ue(v) |
|   if( z_near_flag ) |  |
|     depth_rep_info_element( ZNearSign, ZNearExp, ZNearMantissa, ZNearManLen ) |  |
|   if( z_far_flag ) |  |
|     depth_rep_info_element( ZFarSign, ZFarExp, ZFarMantissa, ZFarManLen ) |  |
|   if( d_min_flag ) |  |
|     depth_rep_info_element( DMinSign, DMinExp, DMinMantissa, DMinManLen ) |  |
|   if( d_max_flag ) |  |
|     depth_rep_info_element( DMaxSign, DMaxExp, DMaxMantissa, DMaxManLen ) |  |
|   if( depth_representation_type == 3 ) { |  |
|     depth_nonlinear_representation_num_minus1 | ue(v) |
|     for( i= 1; i <= depth_nonlinear_representation_num_minus1 + 1; i++ ) |  |
|       depth_nonlinear_representation_model[ i ] | ue(v) |
|   } |  |
| } |  |

An example depth representation information SEI message semantics is as follows. The syntax elements in the depth representation information (DRI) SEI message specify various parameters for auxiliary pictures of type AUX_DEPTH for the purpose of processing decoded primary and auxiliary pictures prior to rendering on a 3D display, such as view synthesis. Specifically, depth or disparity ranges for depth pictures are specified.

A depth_representation_type specifies the representation definition of decoded luma samples of auxiliary pictures as specified in Table Y1. In Table Y1, disparity specifies the horizontal displacement between two texture views and Z value specifies the distance from a camera. The value of depth_representation_type shall be in the range of 0 to 15, inclusive. The variable maxVal is set equal to (1<<BitDepthY)−1.

TABLE Y1

| | Definition of depth_representation_type |
|---|---|
| depth_representation_type | Interpretation |
| 0 | Each decoded luma sample value of an auxiliary picture represents an inverse of Z value that is uniformly quantized into the range of 0 to maxVal, inclusive.<br>When z_far_flag is equal to 1, the luma sample value equal to 0 represents the inverse of ZFar (specified below). When z_near_flag is equal to 1, the luma sample value equal to maxVal represents the inverse of ZNear (specified below). |
| 1 | Each decoded luma sample value of an auxiliary picture represents disparity that is uniformly quantized into the range of 0 to maxVal, inclusive.<br>When d_min_flag is equal to 1, the luma sample value equal to 0 represents DMin (specified below). When d_max_flag is equal to 1, the luma sample value equal to maxVal represents DMax (specified below). |
| 2 | Each decoded luma sample value of an auxiliary picture represents a Z value uniformly quantized into the range of 0 to maxVal, inclusive.<br>When z_far_flag is equal to 1, the luma sample value equal to 0 corresponds to ZFar (specified below). When z_near_flag is equal to 1, the luma sample value equal to maxVal represents ZNear (specified below). |
| 3 | Each decoded luma sample value of an auxiliary picture represents a nonlinearly mapped disparity, normalized in range from 0 to maxVal, as specified by depth_nonlinear_representation_num_minus1 and depth_nonlinear_representation_model[ i ].<br>When d_min_flag is equal to 1, the luma sample value equal to 0 represents DMin (specified below). When d_max_flag is equal to 1, the luma sample value equal to maxVal represents DMax (specified below). |
| Other values | Reserved for future use |

A disparity_ref_view_id specifies the ViewId value against which the disparity values are derived. The value of disparity_ref_view_id shall be in the range of 0 to 1023, inclusive. disparity_ref_view_id is present only if d_min_flag is equal to 1 or d_max_flag is equal to 1 and is useful for depth_representation_type values equal to 1 and 3. The variables in the x column of Table Y2 are derived from the respective variables in the s, e, n and v columns of Table Y2 as follows. If the value of e is in the range of 0 to 127, exclusive, x is set equal to $(-1)s * 2e-31 * (1+n \div 2v)$. Otherwise (e is equal to 0), x is set equal to $(-1)s * 2-(30+v) * n$.

TABLE Y2

Association between depth parameter variables and syntax elements

| x | s | E | n | v |
|---|---|---|---|---|
| ZNear | ZNearSign | ZNearExp | ZNearMantissa | ZNearManLen |
| ZFar | ZFarSign | ZFarExp | ZFarMantissa | ZFarManLen |
| DMax | DMaxSign | DMaxExp | DMaxMantissa | DMaxManLen |
| DMin | DMinSign | DMinExp | DMinMantissa | DMinManLen |

The DMin and DMax values, when present, are specified in units of a luma sample width of the coded picture with ViewId equal to ViewId of the auxiliary picture. The units for the ZNear and ZFar values, when present, are identical but unspecified.

depth_nonlinear_representation_num_minus1 plus 2 specifies the number of piece-wise linear segments for mapping of depth values to a scale that is uniformly quantized in terms of disparity. The value of depth_nonlinear_representation_num_minus1 shall be in the range of 0 to 62, inclusive. depth_nonlinear_representation_model[i] for i ranging from 0 to depth_nonlinear_representation_num_minus1+2, inclusive, specify the piece-wise linear segments for mapping of decoded luma sample values of an auxiliary picture to a scale that is uniformly quantized in terms of disparity. The value of depth_nonlinear_representation_model[i] shall be in the range of 0 to 65 535, inclusive. The values of depth_nonlinear_representation_model[0] and depth_nonlinear_representation_model[depth_no nlinear_representation_num_minus1+2] are both inferred to be equal to 0.

. . .

An example extended DRAP indication SEI message semantics is as follows. The picture associated with an extended DRAP (EDRAP) indication SEI message is referred to as an EDRAP picture. The presence of the EDRAP indication SEI message indicates that the constraints on picture order and picture referencing specified in this subclause apply. These constraints can enable a decoder to properly decode the EDRAP picture and the pictures that are in the same layer and follow it in both decoding order and output order without needing to decode any other pictures in the same layer except the list of pictures referenceablePictures, which includes a list of TRAP or EDRAP pictures in decoding order that are within the same CLVS and identified by the edrap_ref_rap_id[i] syntax elements.

The constraints indicated by the presence of the EDRAP indication SEI message, which shall all apply, are as follows. The EDRAP picture is a trailing picture. The EDRAP picture has a temporal sublayer identifier equal to 0. The EDRAP picture does not include any pictures in the same layer except the referenceablePictures. Any picture that is in the same layer and follows the EDRAP picture in both decoding order and output order does not include, in the active entries of its reference picture lists, any picture that is in the same layer and precedes the EDRAP picture in decoding order or output order, with the exception of the referenceablePictures.

When edrap_leading_pictures_decodable_flag is equal to 1, the following applies. Any picture that is in the same layer and follows the EDRAP picture in decoding order shall follow, in output order, any picture that is in the same layer and precedes the EDRAP picture in decoding order. Any picture that is in the same layer and follows the EDRAP picture in decoding order and precedes the EDRAP picture in output order does not include, in the active entries of its reference picture lists, any picture that is in the same layer and precedes the EDRAP picture in decoding order, with the exception of the referenceablePictures.

Any picture in the list referenceablePictures does not include, in the active entries of its reference picture lists, any picture that is in the same layer and is not a picture at an earlier position in the list referenceablePictures. Consequently, the first picture in referenceablePictures, even when it is an EDRAP picture instead of an TRAP picture, does not include any picture from the same layer in the active entries of its reference picture lists.

An edrap_rap_id_minus1 plus 1 specifies the RAP picture identifier, denoted as RapPicId, of the EDRAP picture. Each TRAP or EDRAP picture is associated with a RapPicId value. The RapPicId value for an TRAP picture is inferred to be equal to 0. The RapPicId values for any two EDRAP pictures associated with the same TRAP picture shall be different.

An edrap_leading_pictures_decodable_flag equal to 1 specifies that both of the following constraints apply. Any picture that is in the same layer and follows the EDRAP picture in decoding order shall follow, in output order, any picture that is in the same layer and precedes the EDRAP picture in decoding order. Any picture that is in the same layer and follows the EDRAP picture in decoding order and precedes the EDRAP picture in output order shall not include, in the active entries of its reference picture lists, any picture that is in the same layer and precedes the EDRAP picture in decoding order, with the exception of the referenceablePictures. An edrap_leading_pictures_decodable_flag equal to 0 does not impose such constraints.

An edrap_reserved_zero_12bits shall be equal to 0 in bitstreams conforming to this version of this Specification. Other values for edrap_reserved_zero_12bits are reserved. Decoders shall ignore the value of edrap_reserved_zero_12bits. An edrap_num_ref_rap_pics_minus1 plus 1 indicates the number of TRAP or EDRAP pictures that are within the same CLVS as the EDRAP picture and may be included in the active entries of the reference picture lists of the EDRAP picture. An edrap_ref_rap_id[i] indicates RapPicId of the i-th RAP picture that may be included in the active entries of the reference picture lists of the EDRAP picture. The i-th RAP picture shall be either the TRAP picture associated with the current EDRAP picture or an EDRAP picture associated with the same TRAP picture as the current EDRAP picture.

Figure 2:
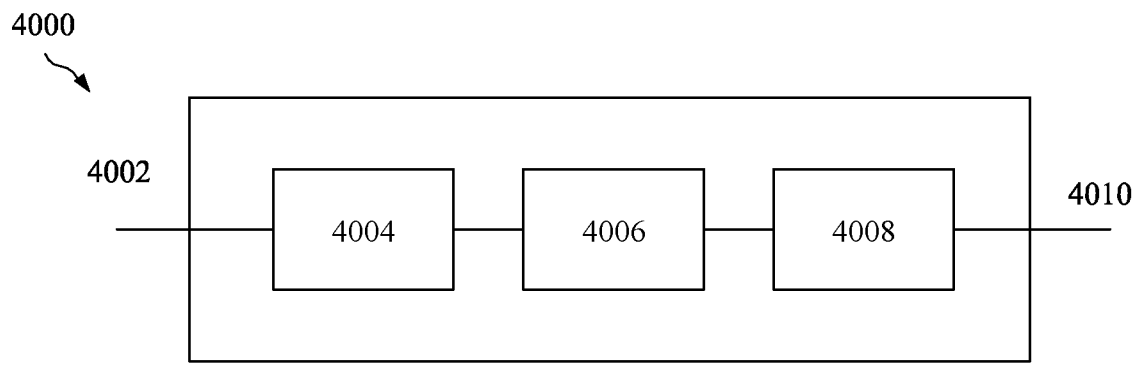
FIG. 2 is a block diagram showing an example video processing system.

FIG. 2 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 4000 may include a coding component 4004 that may implement the various coding or encoding methods described in the present disclosure. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 3:
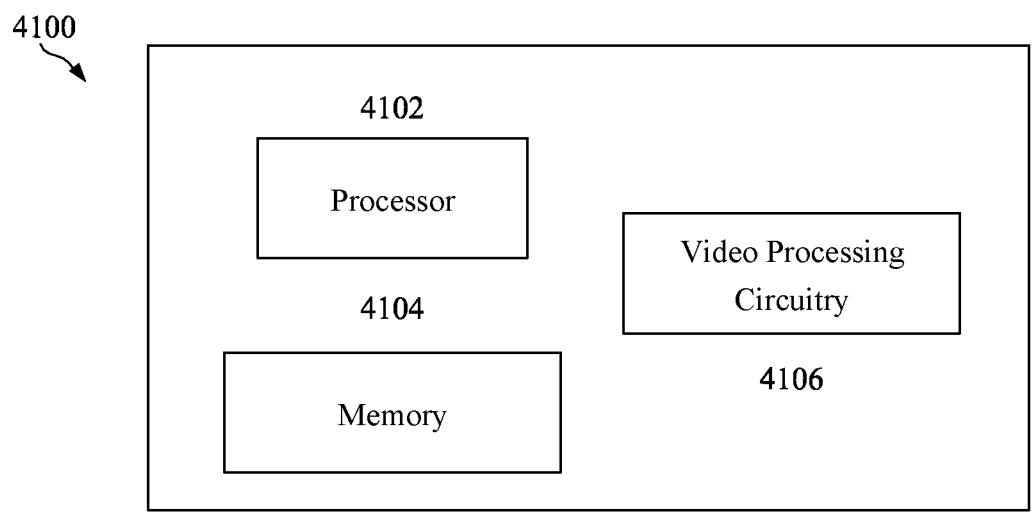
FIG. 3 is a block diagram of an example video processing apparatus.

FIG. 3 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present disclosure. The memory (memories) 4104 may be used for storing data and code used for implementing the methods and techniques described herein. The video processing circuitry 4106 may be used to implement, in hardware circuitry, some techniques described in the present disclosure. In some embodiments, the video processing circuitry 4106 may be at least partly included in the processor 4102, e.g., a graphics co-processor.

Figure 4:
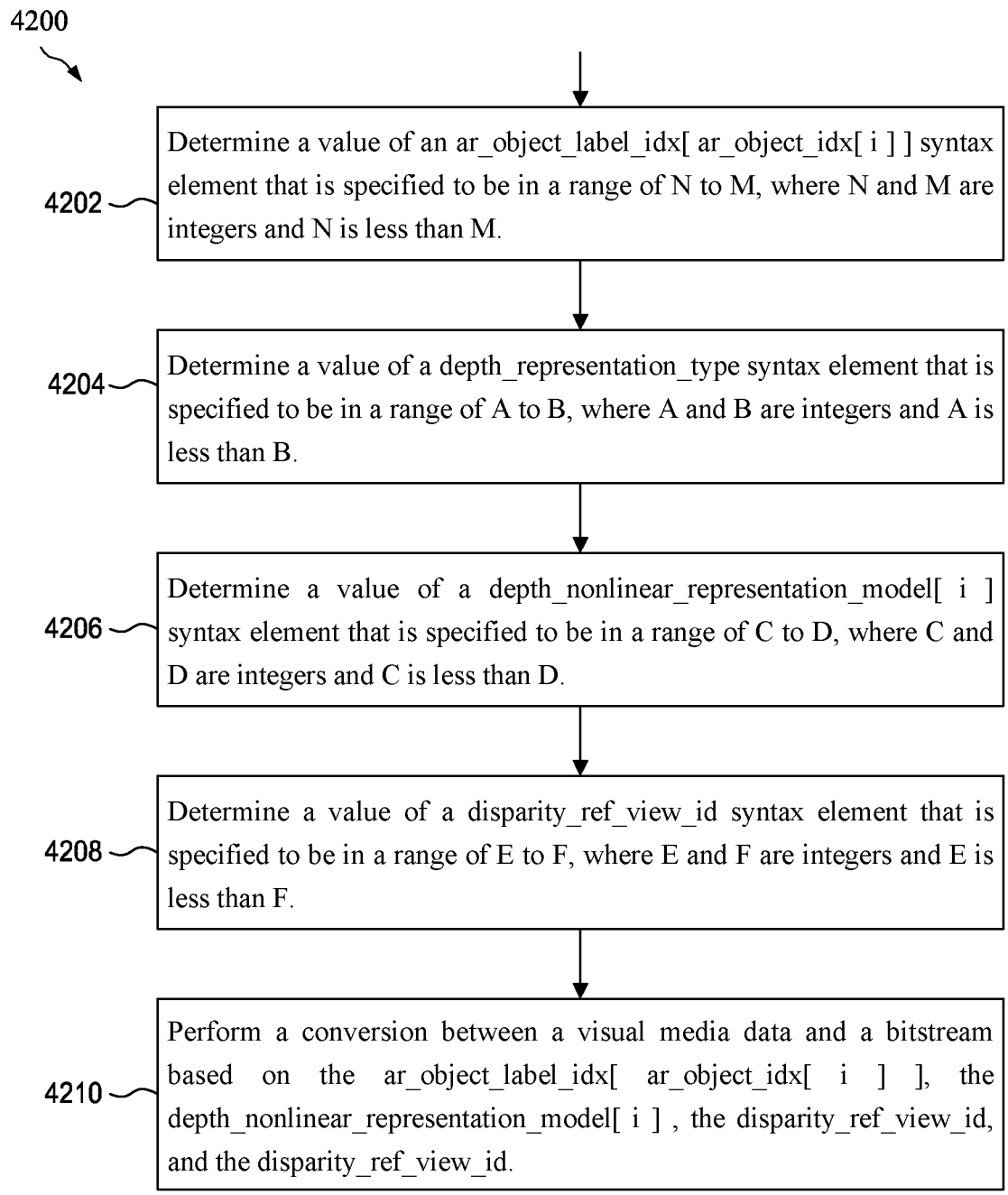
FIG. 4 is a flowchart for an example method of video processing.

FIG. 4 is a flowchart for an example method 4200 of video processing. The method 4200 includes determining a value of an ar_object_label_idx[ar_object_idx[i]] syntax element that is specified to be in a range of N to M at step 4202. N and M are integers and N is less than M. For example, N may be 0, M may be 3, 7, 15, 31, 63, or 255, and the range of N to M may be inclusive. In an example, the ar_object_label_idx[ar_object_idx[i]] syntax element is included in an AR SEI message.

At step 4204, a value of a depth_representation_type syntax element is determined. The depth_representation_type syntax element may be specified to be in a range of A to B. A and B may be integers where A is less than B. For example, A may be 0, B may be 3, 7, 15, 31, 63, 127, or 255, and the range of A to B may be inclusive. In an example, the depth_representation_type syntax element is included in a DRI SEI message.

At step 4206, a value of a depth_nonlinear_representation_model[i] syntax element is determined. The depth_nonlinear_representation_model[i] syntax element is specified to be in a range of C to D. C and D may be integers and C is less than D. For example, C may be 0, D may be 6, 14, 30, 62, 126, or 254, and the range of C to D may be inclusive. In an example, the depth_nonlinear_representation_model[i] syntax element is included in a DRI SEI message.

At step 4208, a value of a disparity_ref_view_id syntax element is determined. The disparity_ref_view_id syntax element is specified to be in a range of E to F. E and F may be integers where E is less than F. For example, E may be 0, F may be 63, 127, 255, 511, 1023, 2047, 4095, 8191, 16383, 32767, or 65535, and the range of E to F may be inclusive. In an example, the disparity ref view_id syntax element is included in the DRI SEI message.

At step 4210, a conversion is performed between a visual media data and a bitstream based on the ar_object_label_idx [ar_object_idx[i]], the depth_nonlinear_representation_ model[i], the disparity ref view_id, and/or the disparity ref view_id. When the method 4200 is performed on an encoder, the conversion includes encoding the visual media data into the bitstream. When the method 4200 is performed on a decoder, the conversion comprises decoding a bitstream to obtain the visual media data.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 5:
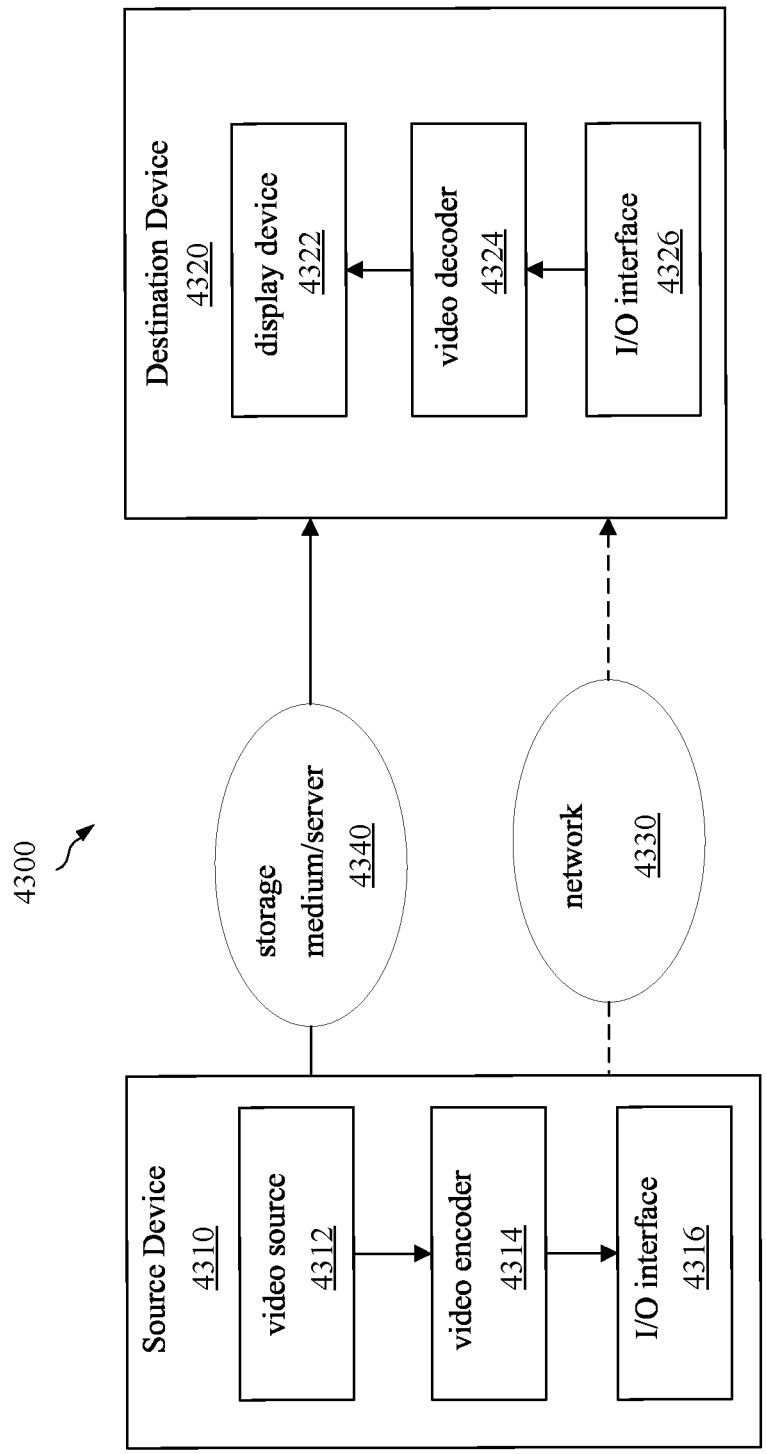
FIG. 5 is a block diagram that illustrates an example video coding system.

FIG. 5 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVC) standard and other current and/or further standards.

Figure 6:
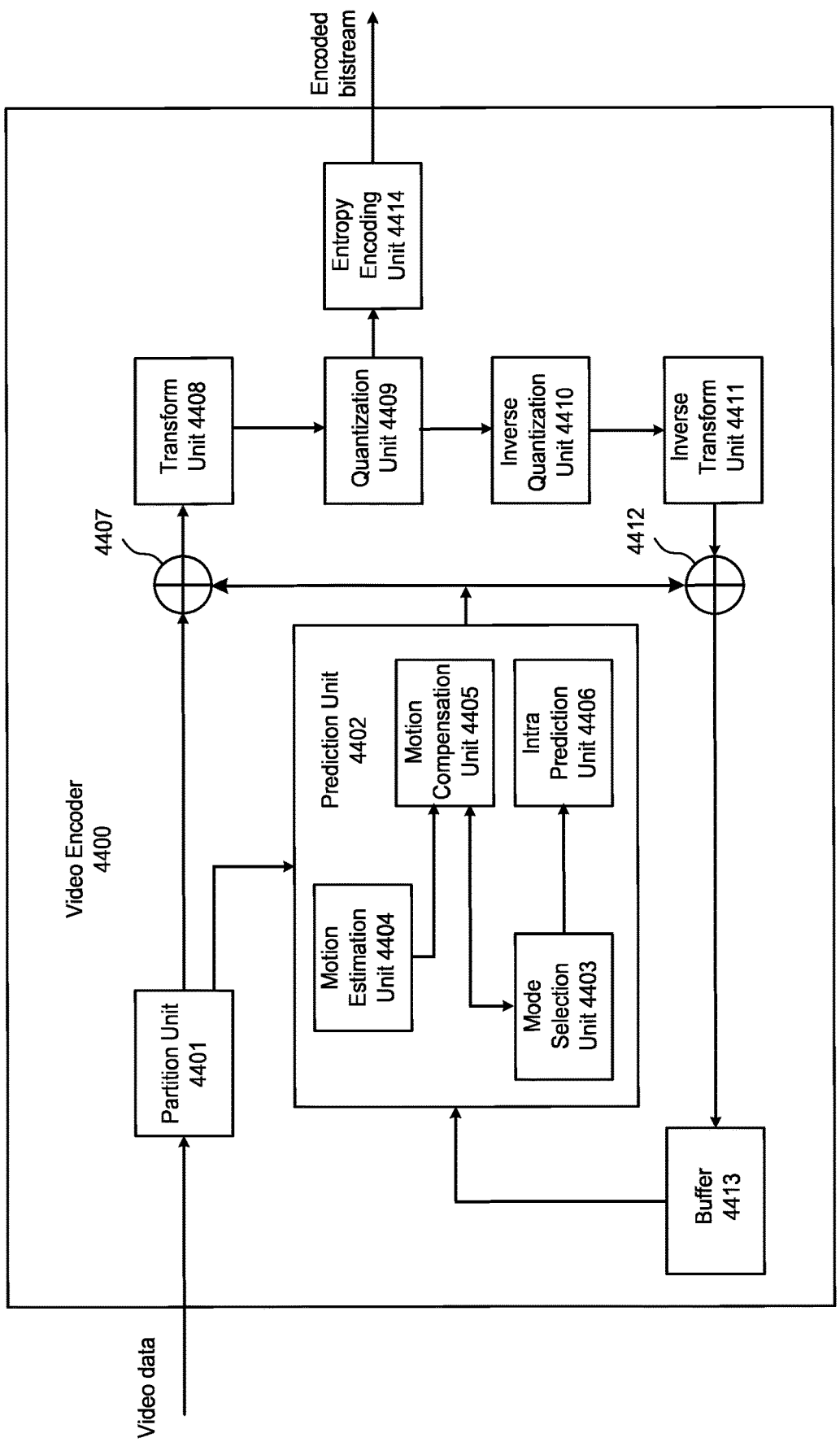
FIG. 6 is a block diagram that illustrates an example encoder.

FIG. 6 is a block diagram illustrating an example of video encoder 4400, which may be video encoder 4314 in the system 4300 illustrated in FIG. 5. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 7:
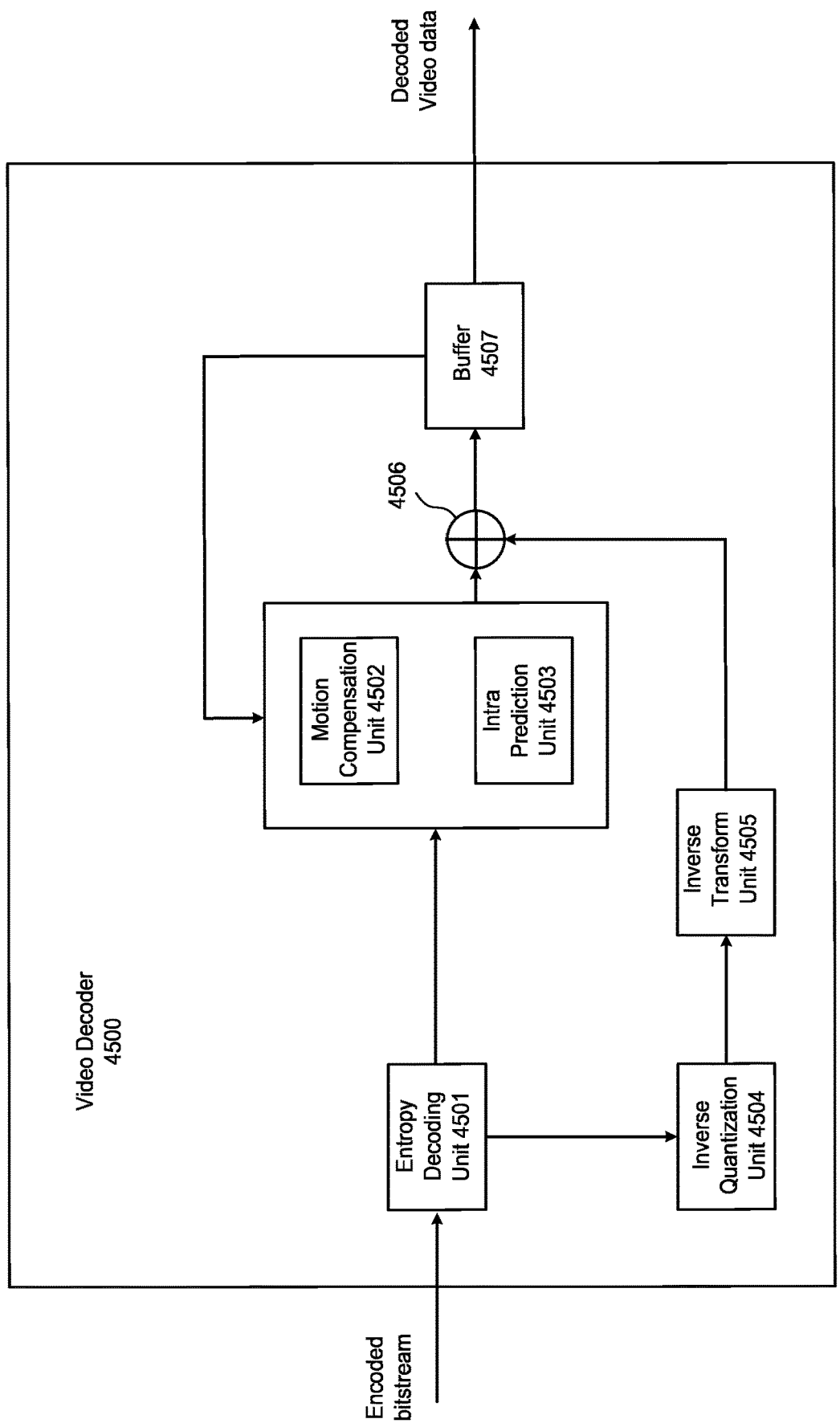
FIG. 7 is a block diagram that illustrates an example decoder.

FIG. 7 is a block diagram illustrating an example of video decoder 4500 which may be video decoder 4324 in the system 4300 illustrated in FIG. 5. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 8:
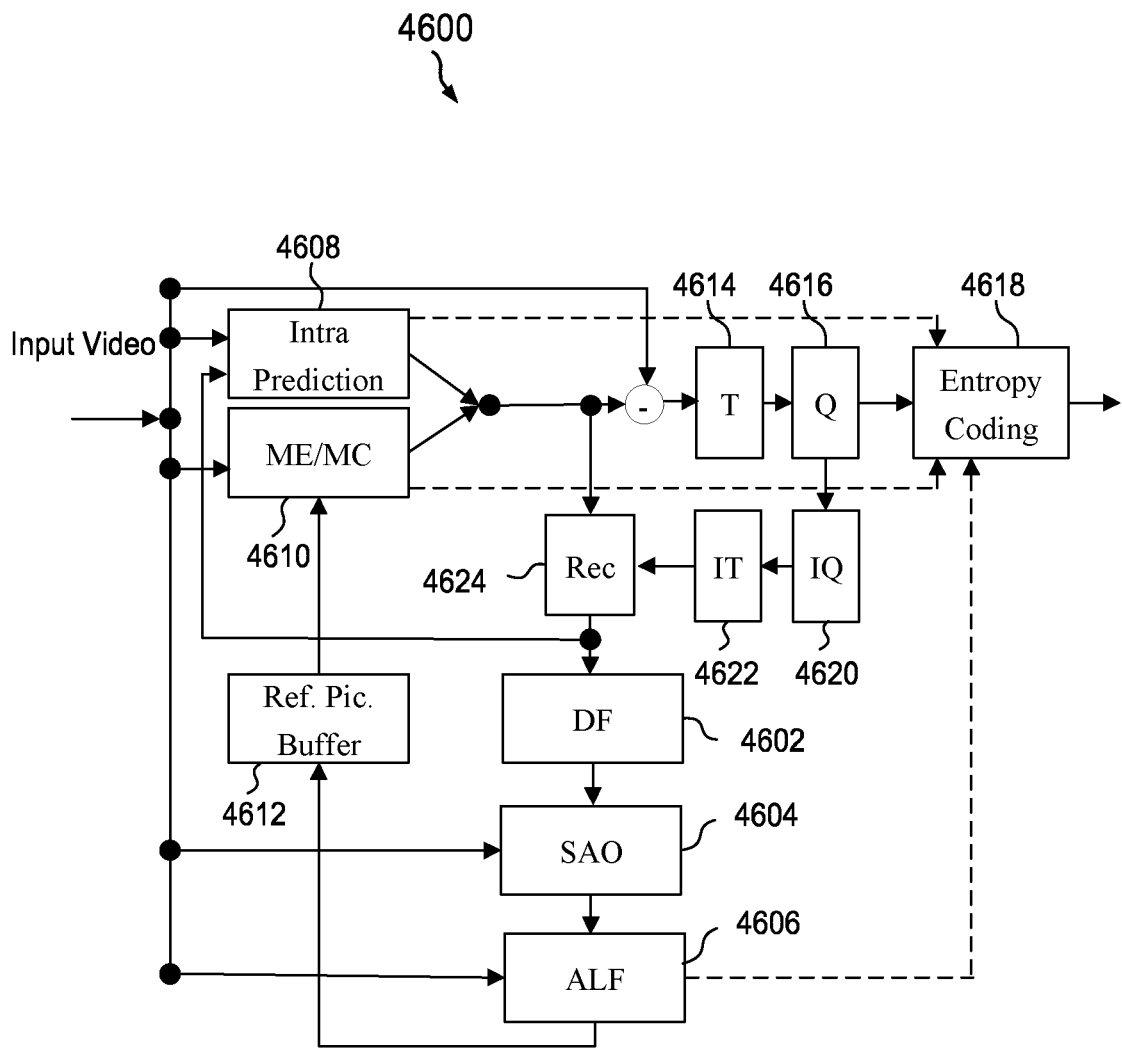
FIG. 8 is a schematic diagram of an example encoder.

FIG. 8 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of techniques discussed herein.

1. A method of media data processing (e.g., method 4200 depicted in FIG. 4), comprising: performing a conversion between a video and a bitstream of the video according to a rule, wherein the rule specifies a range for a value of one or more syntax fields indicative of indexes to labels for corresponding objects in an annotated region the video, wherein the range is between N and M, where N and M are integers.
2. The method of solution 1, wherein N=0 and M=255.
3. The method of solution 1, wherein N=0, and M=3.

The following solutions show example embodiments of techniques discussed in the previous section (e.g., item 2).

4. A method of processing video data, comprising: performing a conversion between a video and a bitstream of the video according to a rule, wherein the rule specifies a type of coding used for coding a syntax element indicative of a number of nonlinear segments used in a piecewise nonlinear mapping of depth information for objects in the video is coded in the bitstream.
5. The method of solution 1, wherein the rule specifies that the syntax element is coded as an unsigned integer 0-th order Exp-Golomb-coded syntax element with the left bit first coding.
6. The method of solution 1, wherein the rule specifies that the syntax element is u(N') coded, where N' is a positive integer.
7. The method of solution 1, wherein the rule specifies that the syntax element is coded as a signed integer 0-th order Exp-Golomb-coded syntax element with the left bit first.
8. The method of solutions 1-4, wherein the rule specifies that a value of the syntax element is constrained to be within N and M, where N and M are integers.
9. The method of solution 5, wherein N=0 and M=65535.
10. The method of solution 2, wherein N=0, and M=3.

The following solutions show example embodiments of techniques discussed in the previous section (e.g., item 3).

11. A method of processing video data, comprising: performing a conversion between a video and a bitstream of the video according to a rule, wherein the rule specifies a constraint on a syntax element in a supplemental enhancement information syntax structure representing depth information of one or more objects in the video.
12. The method of solution 11, wherein the syntax element includes a depth representation type, and wherein the rule specifies that a value of the syntax element is constrained to be in a range between N and M, where N and M are integers.
13. The method of solution 11, wherein the syntax element indicates a number of nonlinear mapping models for depth information and wherein the rule specifies that the syntax element is in a range between 0 to M, where M is an integer.
14. The method of solution 11, wherein the syntax element indicates an identifier of a disparity reference view, and wherein the rule specifies that a value of the syntax element is between 0 and M, where M is an integer.

The following solutions show example embodiments of techniques discussed in the previous section (e.g., item 4).

15. A method of processing video data, comprising: performing a conversion between a video and a bitstream of the video according to a rule, wherein the rule specifies that a value of a flag indicative of a picture that is an extended dependent random access point controls (1) a first order constraint on pictures in a same layer as the picture and follows the picture in a decoding order and an output order, and (2) a second order constraint on pictures in the same layer as the picture and following the picture in the decoding order and preceding the picture in the output order.
16. The method of solution 15, wherein the value is equal to 1.
17. The method of any of solutions 1-16, wherein the conversion includes generating the bitstream from the video.
18. The method of any of solutions 1-16, wherein the conversion includes generating the video from the bitstream.
19. A video decoding apparatus comprising a processor configured to implement a method recited in one or more of solutions 1 to 18.
20. A video encoding apparatus comprising a processor configured to implement a method recited in one or more of solutions 1 to 18.
21. A computer program product having computer code stored thereon, the code, when executed by a processor, causes the processor to implement a method recited in any of solutions 1 to 18.
22. A method of video processing comprising generating a bitstream according to a method recited in any one or more of solutions 1-8 and storing the bitstream on a computer readable medium.
23. A method, apparatus or system described in the present disclosure.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of processing video data, comprising:
performing, for a conversion between a video and a bitstream of the video, according to a rule,
wherein the rule specifies that a value of a first syntax element in a depth representation information (DRI) supplemental enhancement information (SEI) message is in a range of 0 to 15, inclusive, and
wherein the first syntax element in the DRI SEI message specifies a representation definition of decoded luma samples of auxiliary pictures,
wherein the rule specifies that a third syntax element indicating a view identifier for which disparity values are derived is included in the DRI SEI message when a value of a fourth syntax element indicates that syntax elements specifying a minimum disparity value are present in a DRI syntax structure or a value of a fifth syntax element indicates that syntax elements specifying a maximum disparity value are present in the DRI syntax structure.

2. The method of claim 1, wherein a second syntax element is included in the DRI SEI message when the value of the first syntax element is equal to 3, and
wherein the second syntax element specifies a number of piece-wise linear segments for mapping of depth values to a scale that is uniformly quantized in terms of disparity.

3. The method of claim 2, wherein the rule specifies that a value of the second syntax element in the DRI SEI message is in a range of 0 to 62, inclusive.

4. The method of claim 1, wherein a value of the third syntax element in the DRI SEI message is in a range of 0 to 1023, inclusive.

5. The method of claim 1, wherein the third syntax element is useful for the value of the first syntax element equal to 1 and the value of the first syntax element equal to 3.

6. The method of claim 1, wherein the rule specifies that a value of a sixth syntax element in an annotated regions (AR) SEI message is in a range of N to M inclusive, where N and M are integers and N is less than M; and
wherein the sixth syntax element in the AR SEI message indicates an index of a label corresponding to an i-th AR object index.

7. The method of claim 6, wherein N=0, and M=255.

8. The method of claim 2, the first syntax element and the second syntax element are Exp-Golomb-coded using an unsigned integer.

9. The method of claim 1, the third syntax element is Exp-Golomb-coded using an unsigned integer.

10. The method of claim 6, the sixth syntax element is Exp-Golomb-coded using an unsigned integer.

11. The method of claim 1, wherein the conversion comprises encoding the video into the bitstream.

12. The method of claim 1, wherein the conversion comprises decoding the video from the bitstream.

13. An apparatus for processing video data comprising a processor and a non-transitory memory with instructions thereon, wherein the instructions upon execution by the processor cause the processor to:
perform, for a conversion between a video and a bitstream of the video, according to a rule,
wherein the rule specifies that a value of a first syntax element in a depth representation information (DRI) supplemental enhancement information (SEI) message is in a range of 0 to 15, inclusive, and
wherein the first syntax element in the DRI SEI message specifies a representation definition of decoded luma samples of auxiliary pictures,
wherein the rule specifies that a third syntax element indicating a view identifier for which disparity values are derived is included in the DRI SEI message when a value of a fourth syntax element indicates that syntax elements specifying a minimum disparity value are present in a DRI syntax structure or a value of a fifth syntax element indicates that syntax elements specifying a maximum disparity value are present in the DRI syntax structure.

14. The apparatus of claim 13, wherein a second syntax element is included in the DRI SEI message when the value of the first syntax element is equal to 3,
wherein the second syntax element specifies a number of piece-wise linear segments for mapping of depth values to a scale that is uniformly quantized in terms of disparity, and
wherein the rule specifies that a value of the second syntax element in the DRI SEI message is in a range of 0 to 62, inclusive.

15. The apparatus of claim 14,
wherein a value of the third syntax element in the DRI SEI message is in a range of 0 to 1023, inclusive,
wherein the third syntax element is useful for the values of the first syntax element equal to 1 and 3,
wherein the rule specifies that a value of a sixth syntax element in an annotated regions (AR) SEI message is in a range of N to M inclusive, where N and M are integers and N is less than M,
wherein the sixth syntax element in the AR SEI message indicates an index of a label corresponding to an i-th AR object index, and
wherein N=0, and M=255.

16. A non-transitory computer-readable storage medium storing instructions that cause a processor to:
perform, for a conversion between a video and a bitstream of the video, according to a rule,
wherein the rule specifies that a value of a first syntax element in a depth representation information (DRI) supplemental enhancement information (SEI) message is in a range of 0 to 15, inclusive, and
wherein the first syntax element in the DRI SEI message specifies a representation definition of decoded luma samples of auxiliary pictures, wherein the rule specifies that a third syntax element indicating a view identifier for which disparity values are derived is included in the DRI SEI message when a value of a fourth syntax element indicates that syntax elements specifying a minimum disparity value are present in a DRI syntax structure or a value of a fifth syntax element indicates that syntax elements specifying a maximum disparity value are present in the DRI syntax structure.

17. The non-transitory computer-readable storage medium of claim 16, wherein a second syntax element is included in the DRI SEI message when the value of the first syntax element is equal to 3,
wherein the second syntax element specifies a number of piece-wise linear segments for mapping of depth values to a scale that is uniformly quantized in terms of disparity,
wherein the rule specifies that a value of the second syntax element in the DRI SEI message is in a range of 0 to 62, inclusive,
wherein a value of the third syntax element in the DRI SEI message is in a range of 0 to 1023, inclusive,
wherein the third syntax element is useful for the values of the first syntax element equal to 1 and 3,
wherein the rule specifies that a value of a sixth syntax element in an annotated regions (AR) SEI message is in a range of N to M inclusive, where N and M are integers and N is less than M,
wherein the sixth syntax element in the AR SEI message indicates an index of a label corresponding to an i-th AR object index, and
wherein N=0, and M=255.

18. A non-transitory computer-readable recording medium storing a bitstream of a video which is generated by a method performed by a video processing apparatus, wherein the method comprises:
generating the bitstream of the video according to a rule,
wherein the rule specifies that a value of a first syntax element in a depth representation information (DRI) supplemental enhancement information (SEI) message is in a range of 0 to 15, inclusive, and
wherein the first syntax element in the DRI SEI message specifies a representation definition of decoded luma samples of auxiliary pictures,
wherein the rule specifies that a third syntax element indicating a view identifier for which disparity values are derived is included in the DRI SEI message when a value of a fourth syntax element indicates that syntax elements specifying a minimum disparity value are present in a DRI syntax structure or a value of a fifth syntax element indicates that syntax elements specifying a maximum disparity value are present in the DRI syntax structure.

19. The non-transitory computer-readable recording medium of claim 18, wherein a second syntax element is included in the DRI SEI message when the value of the first syntax element is equal to 3,
wherein the second syntax element specifies a number of piece-wise linear segments for mapping of depth values to a scale that is uniformly quantized in terms of disparity,
wherein the rule specifies that a value of the second syntax element in the DRI SEI message is in a range of 0 to 62, inclusive,
wherein a value of the third syntax element in the DRI SEI message is in a range of 0 to 1023, inclusive,
wherein the third syntax element is useful for the values of the first syntax element equal to 1 and 3,
wherein the rule specifies that a value of a sixth syntax element in an annotated regions (AR) SEI message is in a range of N to M inclusive, where N and M are integers and N is less than M,
wherein the sixth syntax element in the AR SEI message indicates an index of a label corresponding to an i-th AR object index, and
wherein N=0, and M=255.

* * * * *